United States Patent [19]
Kobayashi

[11] Patent Number: 5,724,335
[45] Date of Patent: Mar. 3, 1998

[54] OBJECTIVE LENS FOR RECORDING AND REPRODUCING FOR USE IN AN OPTICAL INFORMATION RECORDING MEDIUM

[75] Inventor: Masaya Kobayashi, Hachioji, Japan

[73] Assignee: Konica Corporation, Tokyo, Japan

[21] Appl. No.: 735,273

[22] Filed: Oct. 22, 1996

[30] Foreign Application Priority Data

Oct. 25, 1995 [JP] Japan ................................. 6-299281

[51] Int. Cl.$^6$ ................................................ G11B 7/00
[52] U.S. Cl. ............................................ 369/112; 369/58
[58] Field of Search ........................... 369/112, 44.12, 369/44.23, 44.24, 58, 44.25; 359/718

[56] References Cited

U.S. PATENT DOCUMENTS

| | | | |
|---|---|---|---|
| 5,235,581 | 8/1993 | Miyagawa et al. | 369/112 |
| 5,416,757 | 5/1995 | Luecke et al. | 369/112 |

Primary Examiner—Nabil Hindi
Attorney, Agent, or Firm—Finnegan, Henderson, Farabow, Garrett & Dunner, L.L.P.

[57] ABSTRACT

An optical system includes a laser light source; an objective lens for converging luminous flux emitted from the laser light source onto an information recording surface of an optical information recording medium through a transparent substrate of the optical information recording medium; and lateral magnification change device for changing a lateral magnification of the objective lens from a first lateral magnification $m_1$ to a second lateral magnification $m_2$ which is less than $m_1$ according to a thickness of the transparent substrate. An amount of an offense against sine condition $SC(m_1:NA_2)$ represented by the following expression for $NA_2$ at the first lateral magnification $m_1$ of the objective lens satisfies the following conditional expression, $$0.06 \geq SC(m_1:NA_2)/f \geq 0.002$$

and $$SC(m_1:NA_2) = d_2 \cdot \cos(u_2)/NA_2 - (1-m_1) \cdot f$$

wherein $f$ represents a focal length of the objective lens, $NA_2$ represents a numerical aperture of the objective lens at the second lateral magnification $m_2$, $d_2$ represents a height of a ray on a principal plane of the objective lens from an optical axis for the numerical aperture $NA_2$ at the first lateral magnification $m_1$, and $u_2$ represents an incident angle of the ray to the objective lens for the numerical aperture $NA_2$ at the first lateral magnification $m_1$.

23 Claims, 31 Drawing Sheets

NA 0.6

−0.010 0 0.010
SPHERICAL ABERRATION

NA 0.6

−0.010 0 0.010
OFFENSE AGAINST SINE CONDITION

NA 0.38

−0.010 0 0.010
SPHERICAL ABERRATION

NA 0.38

−0.010 0 0.010
OFFENSE AGAINST SINE CONDITION

NA 0.60

-0.010 0 0.010
SPHERICAL
ABERRATION

NA 0.60

-0.010 0 0.010
OFFENSE AGAINST
SINE CONDITION

NA 0.38

-0.010 0 0.010
SPHERICAL
ABERRATION

NA 0.38

-0.010 0 0.010
OFFENSE AGAINST
SINE CONDITION

N A O .60

-0.010 0 0.010
SPHERICAL ABERRATION

N A O .60

-0.010 0 0.010
OFFENSE AGAINST SINE CONDITION

N A O .38

-0.010 0 0.010
SPHERICAL ABERRATION

N A O .38

-0.010 0 0.010
OFFENSE AGAINST SINE CONDITION

N A O . 60

-0.010 0 0.010
SPHERICAL ABERRATION

N A O . 60

-0.010 0 0.010
OFFENSE AGAINST SINE CONDITION

N A O . 38

-0.010 0 0.010
SPHERICAL ABERRATION

N A O . 38

-0.010 0 0.010
OFFENSE AGAINST SINE CONDITION

N A O . 58

-0.010 0 0.010
SPHERICAL
ABERRATION

N A O . 58

-0.010 0 0.010
OFFENSE AGAINST
SINE CONDITION

N A O . 55

-0.010 0 0.010
SPHERICAL
ABERRATION

N A O . 55

-0.010 0 0.010
OFFENSE AGAINST
SINE CONDITION

SPHERICAL ABERRATION

OFFENSE AGAINST SINE CONDITION

SPHERICAL ABERRATION

OFFENSE AGAINST SINE CONDITION

SPHERICAL
ABERRATION

OFFENSE AGAINST
SINE CONDITION

SPHERICAL
ABERRATION

OFFENSE AGAINST
SINE CONDITION

OBJECTIVE LENS FOR RECORDING AND REPRODUCING FOR USE IN AN OPTICAL INFORMATION RECORDING MEDIUM

BACKGROUND OF THE INVENTION

The present invention relates to an objective lens used for an optical system wherein a light beam such as a laser beam or the like is converged on an optical information recording medium and thereby optical information is recorded and reproduced.

In an optical system used for a recording and reproducing apparatus which records on an information recording medium such as an optical disk or the like, a light spot converged by an objective lens is required to be smaller recently, to comply with high density recording on an information recording medium such as an optical disk or the like or high density reproduction therefrom. Therefore, there is a demand for an objective lens having a large numerical aperture (NA) (for example, NA=0.6). Further, a high density disk (DVD and others) having substrate thickness of 0.6 mm has been put to practical use, and there has been a demand for an optical system complying with both the high density disk and a conventional disk having substrate thickness of 1.2 mm (CD, CD-ROM etc.).

In the case of a great NA, when a thickness of a substrate placed in a converged light flux is deviated from a prescribed thickness, there is caused serious spherical aberration. In the case of an objective lens having an NA value of 0.60 and magnification of $-1/12$, when it is optimized under the condition that a wavelength of a laser beam emitted from a laser beam source is 635 nm, a substrate thickness is 0.6 mm and a refractive index of the substrate is 1.58, a change of the substrate thickness increases aberration at a rate of about 0.01 λ rms per a change of 0.01 mm. Therefore, a deviation of substrate thickness of ±0.07 mm causes aberration of 0.07 λ rms, which arrives at Marechal criterion making normal reading possible.

Therefore, there have been proposed various methods for correcting spherical aberration by changing layout of an optical system and thereby changing magnification of an objective lens. These methods include the following.

(1) A method to change magnification of an objective lens by moving a lens which changes a divergence degree of diverged light coming from a light source such as a light source or a divergence degree changing lens (e.g., collimator) (FIG. 25)

(2) A method to change magnification of an objective lens itself by mounting a compensating lens on the light source side against the objective lens or dismounting it therefrom (FIG. 26)

(3) A method to change magnification of an objective lens itself by placing a hologram on the light source side against the objective lens and thereby by selecting one of plurality of light flux emitted from the hologram (FIG. 27)

(4) A method to change magnification of an objective lens itself having on at least one face thereof a hologram surface, wherein magnification is changed through a selecting one of plurality of light flux emitted from the hologram (5) A method to change magnification of an objective lens by having two light sources each being different from the other in terms of wavelength and thereby by switching them (FIG. 28) Incidentally, spherical aberration caused by aforesaid switching can also be corrected by changing a length of on optical path between the objective lens and each of the two light sources.

However, what is considered in these methods is spherical aberration, namely, an on-axis spot, and off-axis characteristics are not considered. When only recording and reproducing of information are considered, satisfactory maintenance of on-axis characteristics is good enough. In the case of the tracking employing a multi-split image pickup device, however, off-axis image pickup characteristic matters, and when an objective lens is tilted due to a manufacturing error or the like, the tilt characteristic matters.

In an example of a conventional objective lens whose spherical aberration and sine condition are corrected to be optimum at its first magnification, there is shown a change of characteristics caused by image height and lens tilt. This objective lens has been designed under the conditions of the following specifications, and aberration curves of its spherical aberration and offense against sine condition are shown in FIGS. 29 (a)-1, 29 (a)-2, 29 (b)-1 and 29 (b)-2, image height characteristics are shown in FIG. 30, and lens tilt characteristics are shown in FIG. 31.

f=3.360755

First magnification $m_1$=0.0 $NA_1$:0.60 transparent substrate thickness $t_1$=0.6 mm Second magnification $m_2$=−0.055 $NA_2$:0.38 transparent substrate thickness $t_2$=1.2 mm The reason of characteristic deterioration in the case of the second magnification shown in FIG. 30 is mainly the influence of the sine condition which is not satisfied as shown in FIG. 29.

SUMMARY OF THE INVENTION

An object of the invention is to make it possible that recording and reproducing by means of optical disks having different substrate thicknesses are conducted in a single optical pickup device, and to maintain the performance of the optical pickup device by correcting aberration with lateral magnification of each objective lens taking off-axis characteristics (image height characteristics) and tilt characteristics into consideration when changing magnification and thereby keeping balance of off-axis characteristics even when the lateral magnification of the objective lens is changed.

An optical system is composed of;

a light source;

an objective lens which converges a light flux emitted from the light source on an information recording surface of an optical information recording medium through a transparent substrate of the optical information recording medium; and a means for changing the lateral magnification of the objective lens itself from the first magnification $m_1$ to the second magnification $m_2$ ($m_1$>$m_2$), depending on the thickness of the transparent substrate of the optical information recording medium, and, offense against sine condition SC ($m_1$:$NA_2$) represented by the following expression for $NA_2$ at the first lateral magnification $m_1$ for the objective lens satisfies the following conditions.

$$0.06 \cdot f \geq SC(m_1:NA_2) \geq 0.002 \cdot f$$

$$SC(m_1:NA_2) = d_2 \cdot \cos(u_2)/NA_2 \cdot (1-m_1) \cdot f$$

f: Focal length of the objective lens $NA_2$: Numerical aperture of the objective lens at the second lateral magnification $m_1$ $d_2$: Height of ray of light on a principal plane of the objective lens from the optical axis on the object side for $NA_2$ at the first lateral magnification $m_1$ $u_2$: Incident angle against the objective lens for $NA_2$ at the first lateral magnification $m_1$ The objective lens is available in the type of glass combination lens (FIG. 14), plastic-glass hybrid lens (FIG. 15), unhomogeneous index of refraction lens (FIG. 16), diffraction lens (FIG. 17), hologram lens, or bi-aspherical single lens. The bi-aspherical single lens is advantageous in terms of cost because it can be processed easily and it is a single lens.

A material for the single aspherical lens may either be glass or resin.

It is preferable that the following conditions are satisfied.

$$0.55 \geq NA_2 \tag{2}$$

$$0.03 \geq SC(m_1:NA_2)/f \tag{3}$$

On the other hand, offense against sine condition SC $(m_1: NA_1)$ corresponding to $NA_1$ for the single objective lens satisfies the following conditions.

$$0.002 \geq [SC(m_1:NA_1) - SC(m_1:NA_2)]/f \tag{4}$$

$$SC(m_1:NA_1)/f \geq -0.002$$

$$SC(m_1:NA_1) = d_1 \cos(u_1)/NA_1$$

where $d_1$ represents a height of a ray on the principal plane of the objective lens from the optical axis for the numerical aperture $NA_1$ at the first lateral magnification $m_1$, and $u_1$ represents an incident angle of the ray to the objective lens for the numerical aperture $NA_1$ at the first lateral magnification $m_1$.

It is also preferable that the following conditions are satisfied.

$$[SC(m_1:NA_1) - SC(m_1:NA_2)]/f \geq -0.003 \tag{5}$$

$$-0.003 \geq [SC(m_1:NA_1) - SC(m_1:NA_2)]/f \geq -0.012 \tag{6}$$

Further, the lateral magnification $m_1$ of the objective lens in the first arrangement may be almost 0.

It is preferable that the objective lens of the invention satisfies the following conditions.

$$NA_1 \geq 0.50 \tag{7}$$

and/or $$NA_2/NA_1 < 0.8 \tag{8}$$

Change amount $\Delta SAt$ of spherical aberration corresponding to change $\Delta t$ of substrate thickness is in a proportional relation under the condition of the same NA, which can be indicated as follows;

$$\Delta t \cdot (nt^2 - 1)/nt^3 \cdot \alpha = \Delta SAt \tag{1}$$

wherein, nt represents an index of refraction of a transparent substrate, and $\alpha$ represents a proportion constant.

On the other hand, it can be considered that change amount $\Delta SAm$ of spherical aberration corresponding to change $\Delta m$ of magnification of a single objective lens is almost in a proportional relation as follows;

$$f \cdot \Delta m \cdot \beta = \Delta SAm \tag{2}$$

wherein, f represents a focal length of the objective lens, and $\beta$ represents a proportion constant.

Therefore, the condition for correcting the spherical aberration totally is as follows.

$$\Delta SAt + \Delta SAm = 0 \tag{3}$$

namely $$\Delta t \cdot (nt^2 - 1)/(nt^3 \cdot f \cdot \Delta m) = -\beta/\alpha \tag{4}$$

In this case, when nt is constant and $\Delta t$ is positive in Expression [1], the spherical aberration becomes over-corrected. Accordingly, $0 < \Delta SAt$ and $1 < nt$ are satisfied, and constant $\alpha$ is positive.

In Expression [2], when a lateral magnification change $\Delta m$ is positive $(0 < \Delta m)$, the spherical aberration becomes over-corrected. Accordingly, $0 < \Delta SAm$ and $0 < f$ are satisfied, and constant $\beta$ is positive.

As a result, when $\Delta t$ $(= t_2 - t_1 > 0)$ is positive, $\Delta m$ is made to be negative by Expression [4].

In this case, when $m_1$ represents the lateral magnification with which the spherical aberration in transparent substrate $t_1$ is most preferably corrected, and $m_2$ represents the lateral magnification with which the spherical aberration in transparent substrate $t_2$ is most preferably corrected, $\Delta m$ can be represented as follows;

$$\Delta m = m_2 - m_1 \tag{5}$$

which leads to the following.

$$m_1 \geq m_2 \tag{6}$$

For satisfying off-axis characteristics with one objective lens in the optical system mentioned above, it is necessary to satisfy the sine condition.

When SC (m:NAk) represents offense against sine condition of ray of light k at magnification m, it can be shown in the following expressions [deduced from (3.47) Expression on page 59 of "Method of designing lenses" written by Yoshiya Matsui (published by Kyoritsu Publishing Co.: First edition on Nov. 5, 1972)];

$$SC(m:NAk) = dk \cdot \cos(uk)/NAk - (1-m) \cdot f \tag{7}$$

$$NAk = \sin(uk')$$

wherein, m represents lateral magnification of a lens, f represents a focal length of a lens, uk represents an angle formed between ray of light entering a lens and an optical axis, and uk' represents an angle formed between ray of light emerging out of the lens and the optical axis. Further, dk represents a height of the ray of light at a principal point of the objective lens on the object side from the optical axis.

When the ray of light enters a lens almost in the form of parallel light, there are satisfied uk=0 and m=0 which result in the following.

$$SC = dk/NAk - f \tag{8}$$

For satisfying the sine condition, the following needs to be satisfied.

$$SC = 0 \tag{9}$$

In the case of correcting spherical aberration by changing lateral magnification of an individual objective lens when the thickness of a transparent substrate is changed from $t_1$ to $t_2$ actually $(t_1 < t_2)$, $m_1$ representing lateral magnification of the objective lens for thickness $t_1$ of a transparent substrate (first magnification) and $m_2$ representing lateral magnification of the objective lens for thickness $t_2$ (second magnification) are caused to satisfy the relation of $m_1 > m_2$ by Expression [6].

In this case, offense against sine condition for the second magnification $m_2$ is lower than that for the first magnification $m_1$. Namely, the following relation is satisfied.

$$SC(m_1:k) > SC(m_2:k) \qquad [10]$$

Therefore, when the sine condition for the first magnification is satisfied [SC ($m_1$:k)=0], SC ($m_2$:k) is smaller than 0, and the offense against sine condition becomes under-correction.

In order to satisfy off-axis characteristics at the second magnification $m_2$, the sine condition corresponding to numerical aperture $NA_2$ at the second magnification must satisfy the relation of SC ($m_2$:$NA_2$)=0. Therefore, it is necessary to make the sine condition at the first magnification to be over-correction.

Further, a height of ray of light corresponding to numerical aperture $NA_2$ at the second magnification from each optical axis passing through the objective lens and that of ray of light corresponding to numerical aperture $NA_2$ at the first magnification are close to each other. Therefore, it is possible to make offense against sine condition SC ($m_2$:$NA_2$) at the second magnification to be almost 0, by establishing offense against sine condition SC ($m_1$:$NA_2$) with $NA_2$ for the first magnification.

Actually, when the value SC ($m_1$:$NA_2$)/f obtained by normalizing the offense against sine condition with a focal length of an objective lens in the first arrangement is smaller than 0.002, the sine condition remains to be under-correction at the second magnification, while, when $NA_2$ is greater than 0.3 in particular, performance of off-axis characteristics can not be maintained. When SC ($m_1$:$NA_2$)/f is greater than 0.06, the offense against sine condition becomes over-correction side even at the second magnification, which causes excessive correction and makes it impossible to maintain the excellent performance.

When $NA_2$ is established to be smaller than 0.55 and greater than the upper limit of condition (3), the offense against sine condition is over-correction even at the second magnification, which causes excessive correction and makes it impossible to maintain off/axis characteristics properly.

In the first magnification, when numerical aperture $NA_1$ is made to be greater to some extent, tilt characteristics (lens tilt characteristics) are made to be greater even when the sine condition is satisfied. In addition to the foregoing, when the numerical aperture exceeds the upper limit of condition expression (4), tilt characteristics are made to be greater. Further, when it exceeds the lower limit of SC ($m_1$: $NA_1$)/f) simultaneously, image height characteristics at the first magnification can not be maintained.

In addition, a method to obtain off-axis characteristics and tilt characteristics which are mostly the same as those satisfying the sine condition at the first magnification while keeping off-axis characteristics at the second magnification, is to satisfy conditional expression (5) while satisfying conditional expressions (2) and (3).

Further, a method to obtain tilt characteristics which are less effective than those satisfying the sine condition at the first magnification while keeping off-axis characteristics at the second magnification, is to satisfy conditional expression (6) while satisfying conditional expression (3).

When the numerical aperture at the first magnification is smaller than 0.5, there is a possibility that off-axis characteristics can be compatible even when aforesaid conditions are not satisfied, because a tolerance of each characteristic is extended. However, aforesaid conditions are especially effective when the numerical aperture at the first magnification is made to be not less than 0.5.

When the ratio of the numerical aperture at the second magnification to that at the first magnification $NA_2/NA_1$ exceeds 0.8, it is difficult to make off-axis characteristics and tilt characteristics to balance between magnifications.

BRIEF DESCRIPTION OF THE DRAWINGS

FIGS. 2(a)-1-2(b)-2 represent aberration curve diagrams for the objective lens in the Example 1 wherein substrate thicknesses of the optical information recording medium are 0.6 mm and 1.2 mm.

FIGS. 5(a)-1-5(b)-2 represent aberration curve diagrams for the objective lens in the Example 2 wherein substrate thicknesses of the optical information recording medium are 0.6 mm and 1.2 mm.

FIGS. 11(a)-1-11(b)-2 represent aberration curve diagrams for the objective lens in Example 4 wherein substrate thicknesses of the optical information recording medium are 0.6 mm and 1.2 mm.

Each of FIGS. 19(a)-1–19(b)-2 represents an aberration diagram showing spherical aberration and offense against sine condition for each magnification in Example 5.

Figure 20:
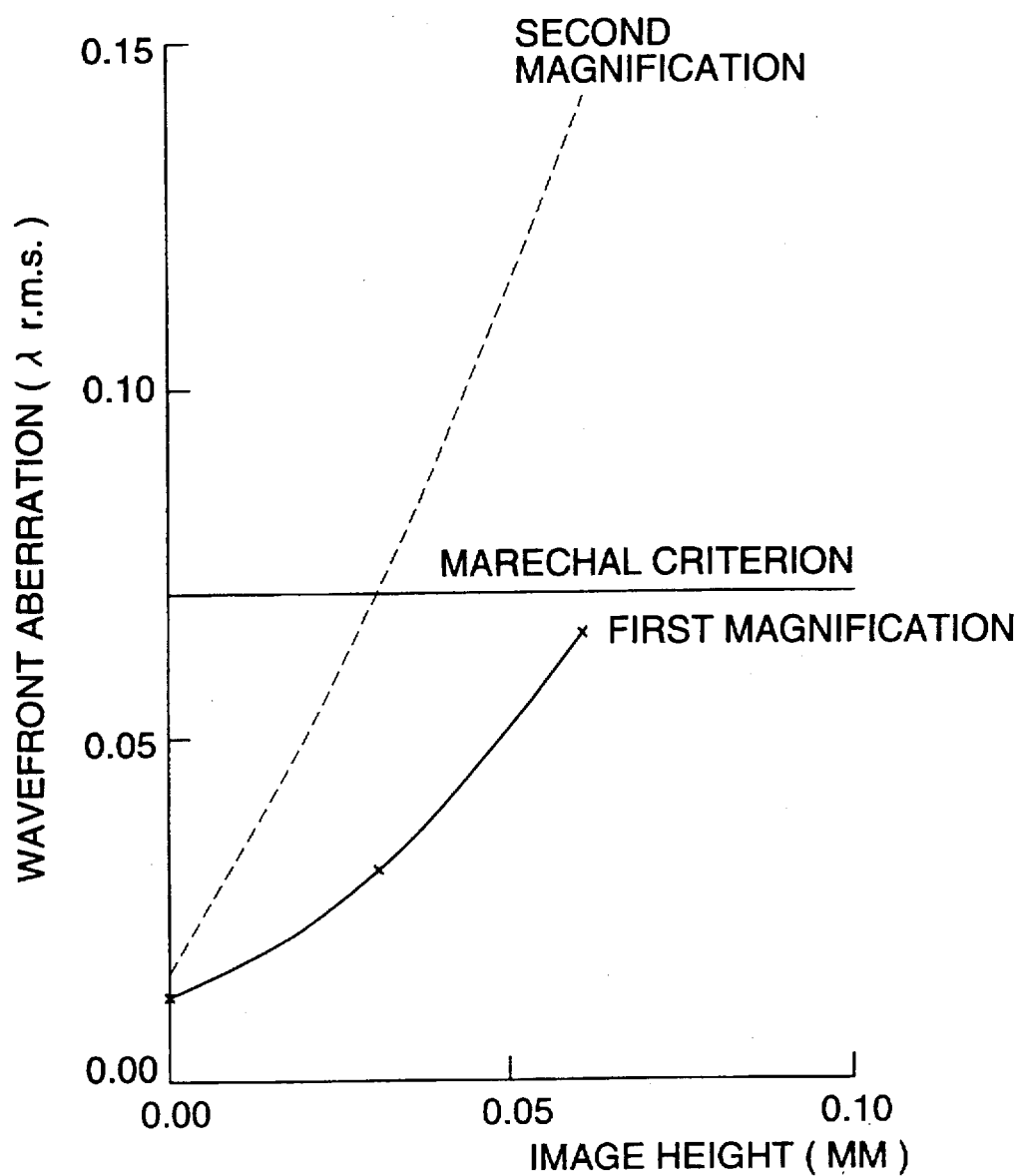

FIG. 20 shows a wavefront aberration diagram indicating off-axis characteristics (image height characteristics) in Example 5.

Figure 21:
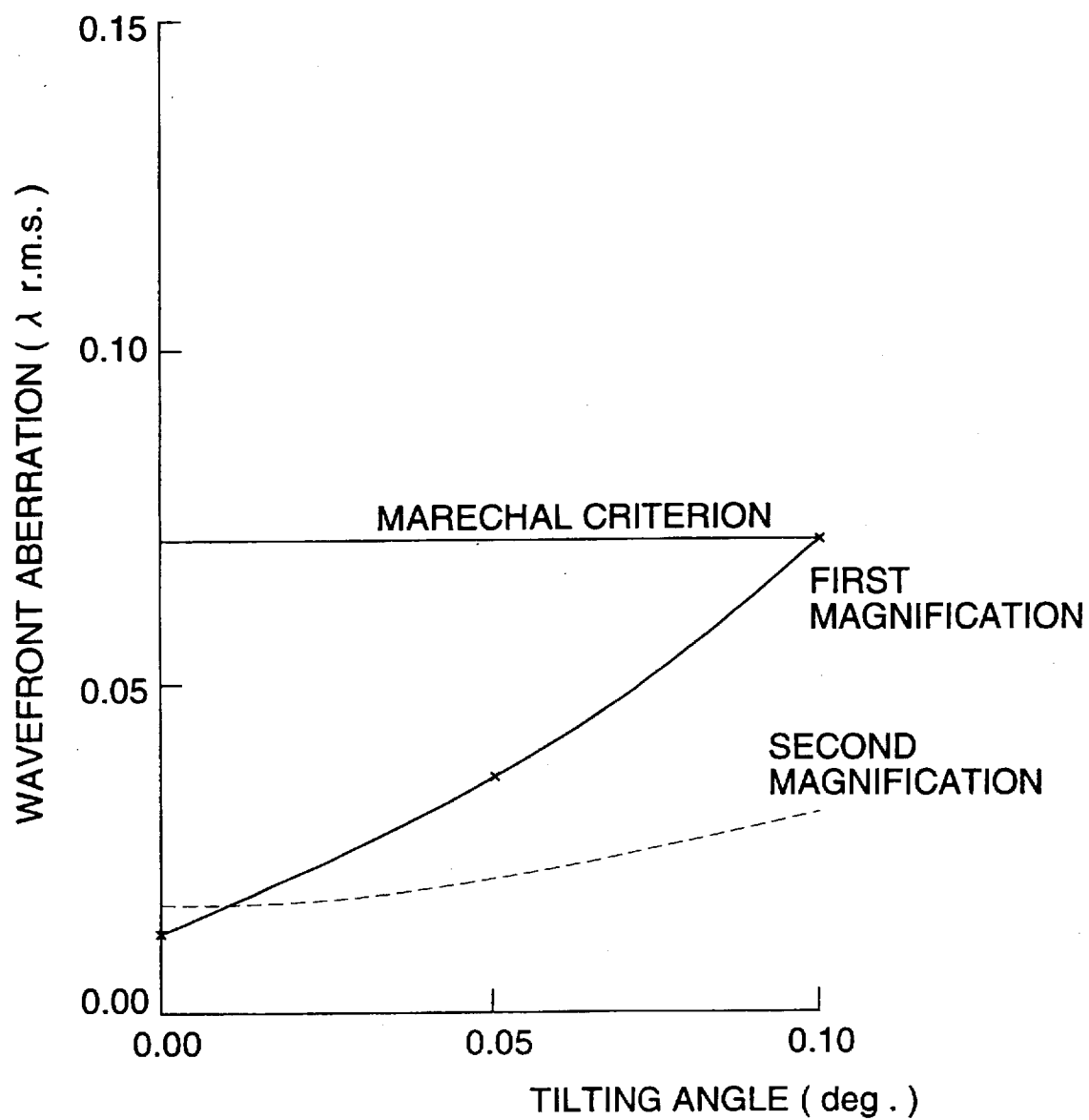

FIG. 21 shows a wavefront aberration diagram indicating tilt characteristics in Example 5.

Each of FIGS. 22(a)-1–22(b)-2 represents an aberration diagram showing spherical aberration and offense against sine condition for each magnification in a conventional example.

Figure 23:
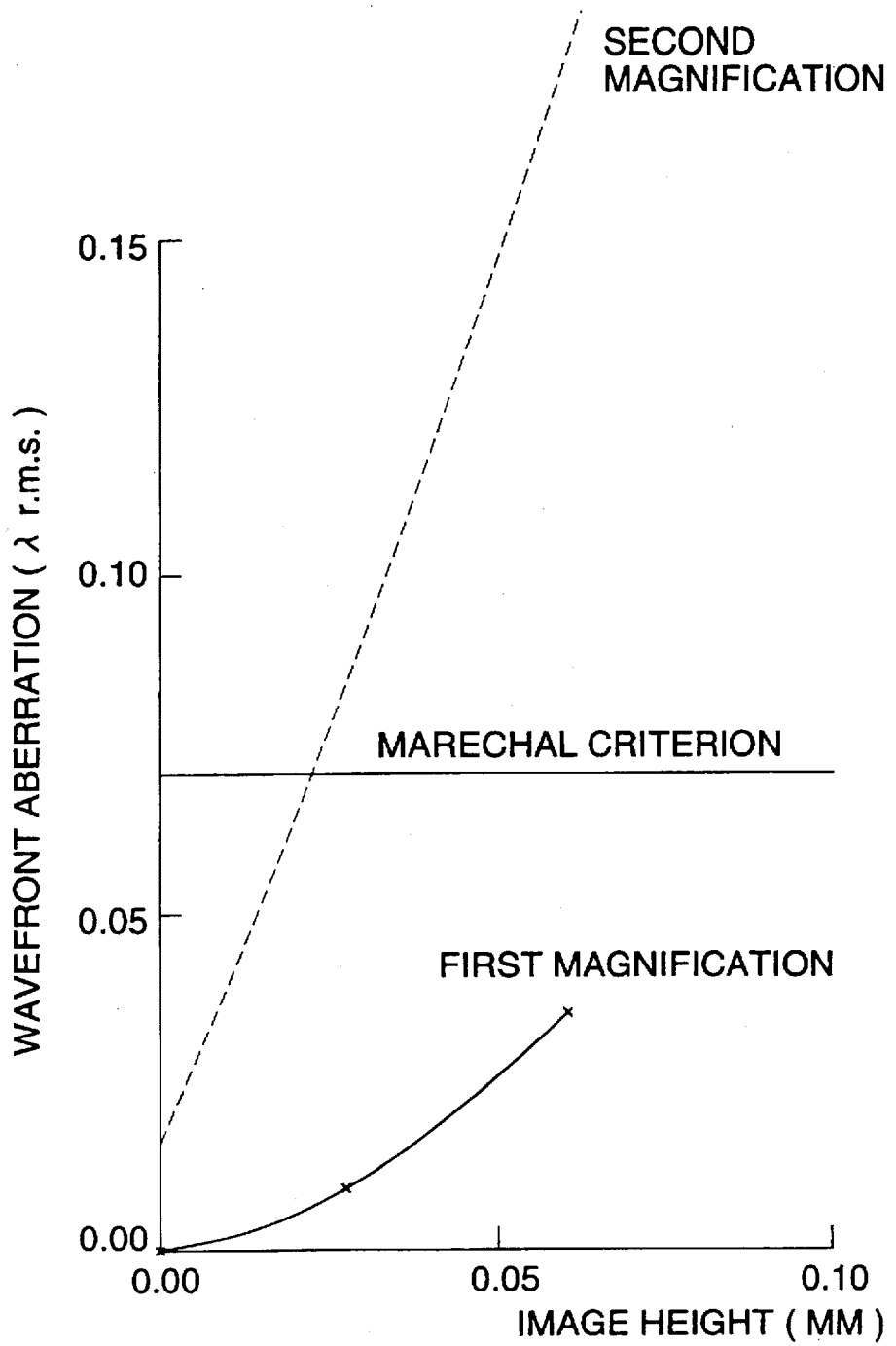

FIG. 23 shows off-axis characteristics of the conventional example.

Figure 24:
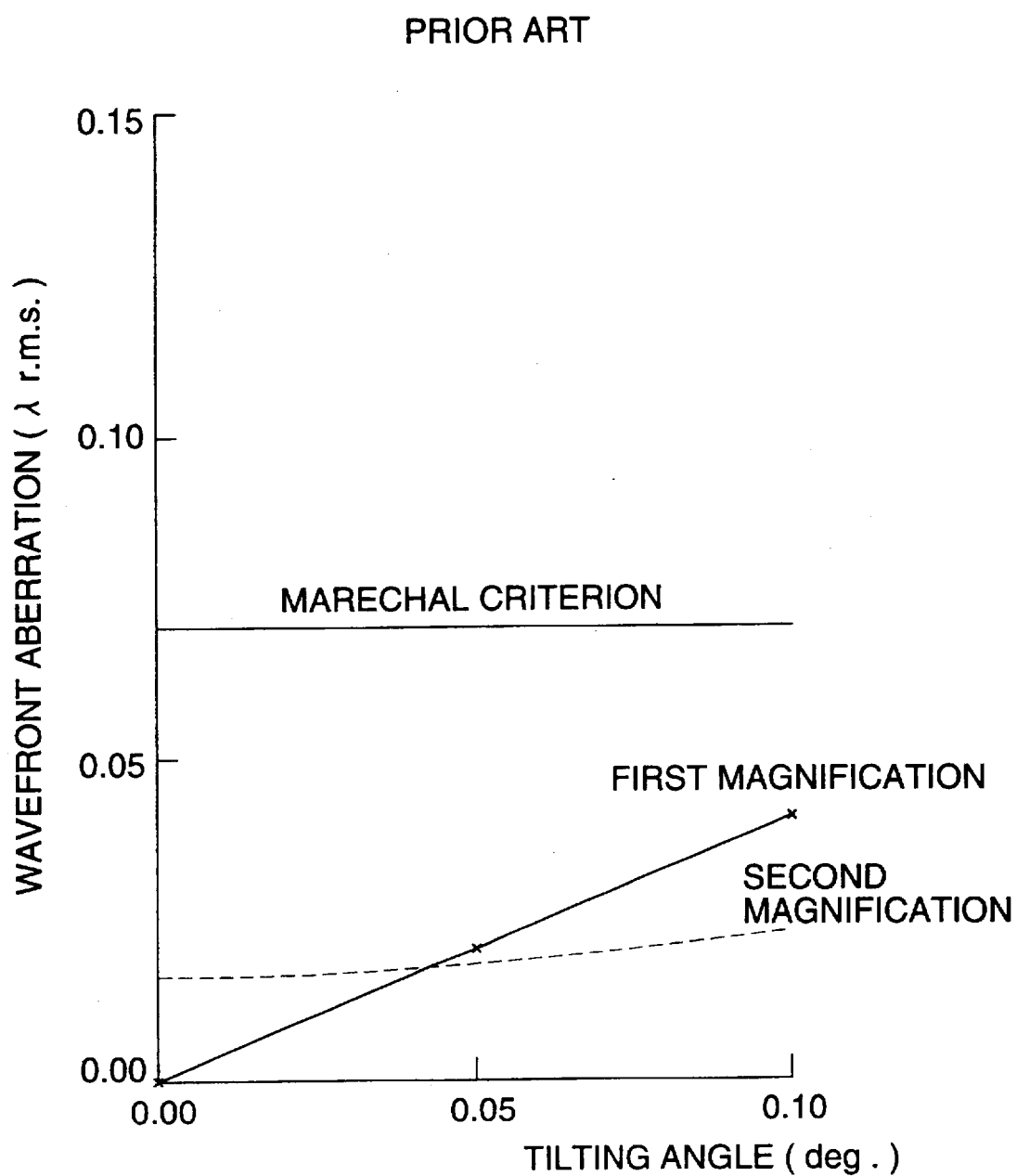

FIG. 24 shows tilt characteristics of the conventional example.

Figure 25:
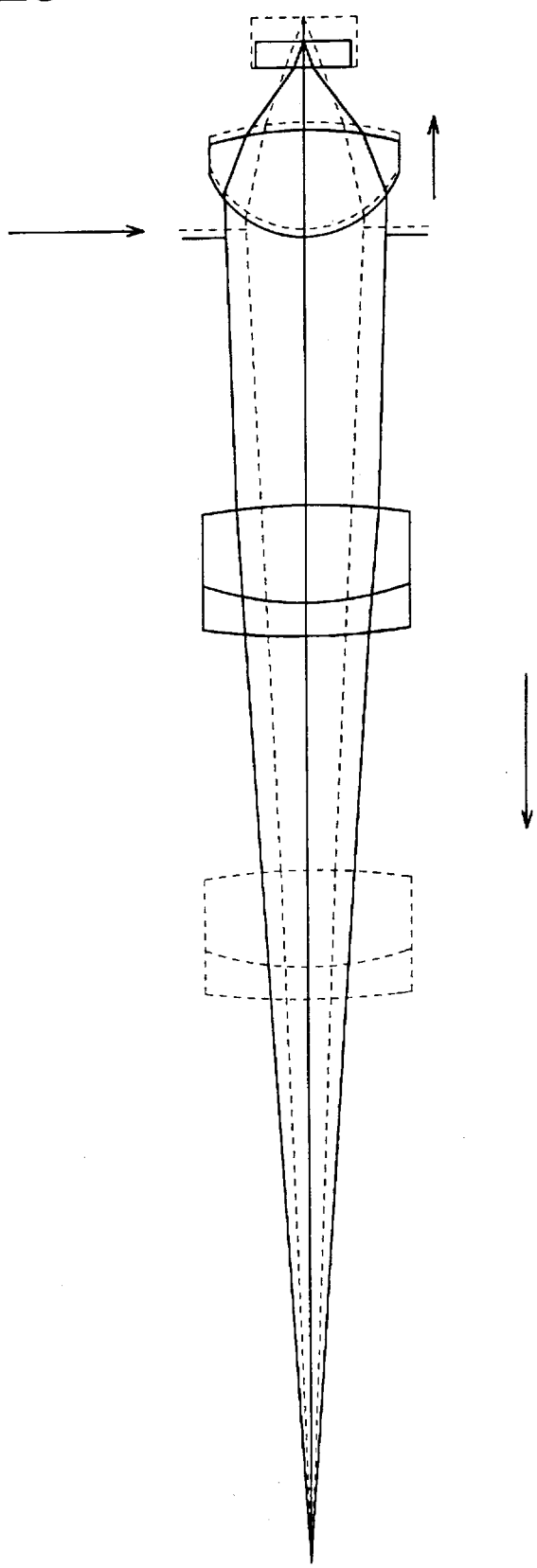

FIG. 25 is a diagram showing how to change a magnification of an objective lens.

Figure 26:
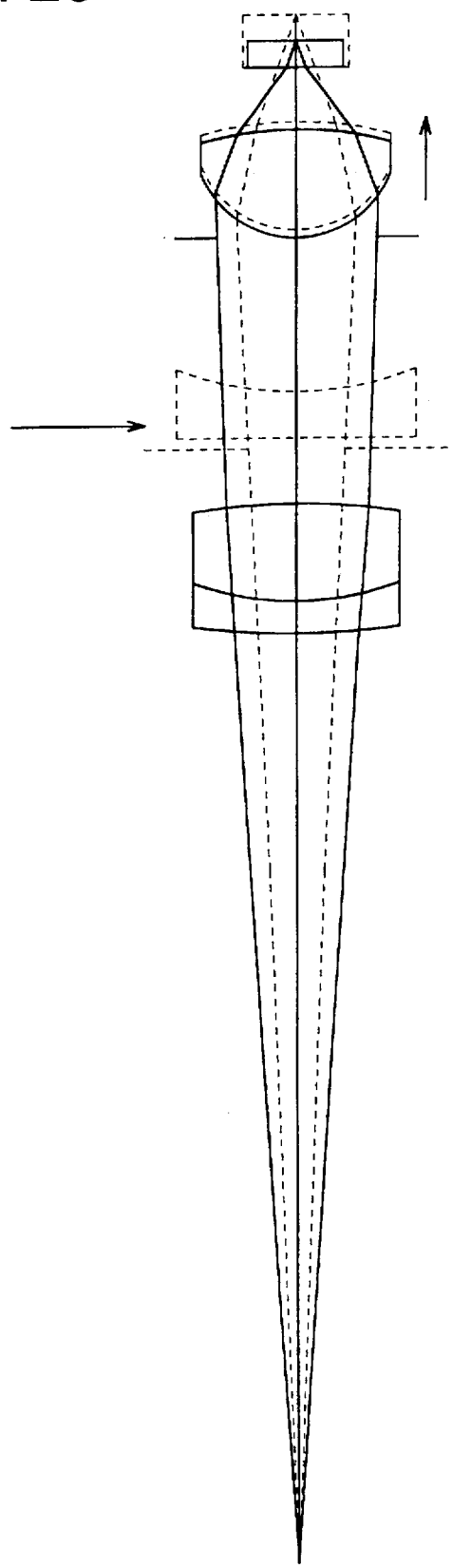

FIG. 26 is a diagram showing how to change a magnification of an objective lens itself.

Figure 27:
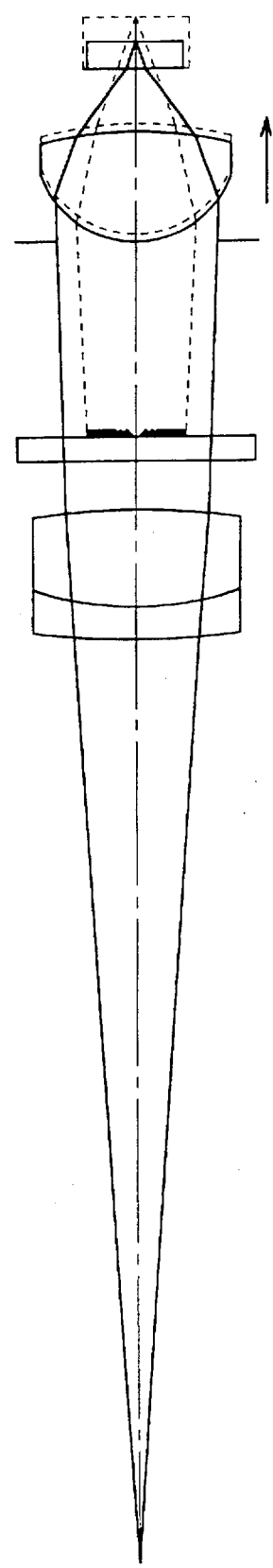

FIG. 27 is a diagram showing how to change a magnification of an objective lens itself when using a hologram.

Figure 28:
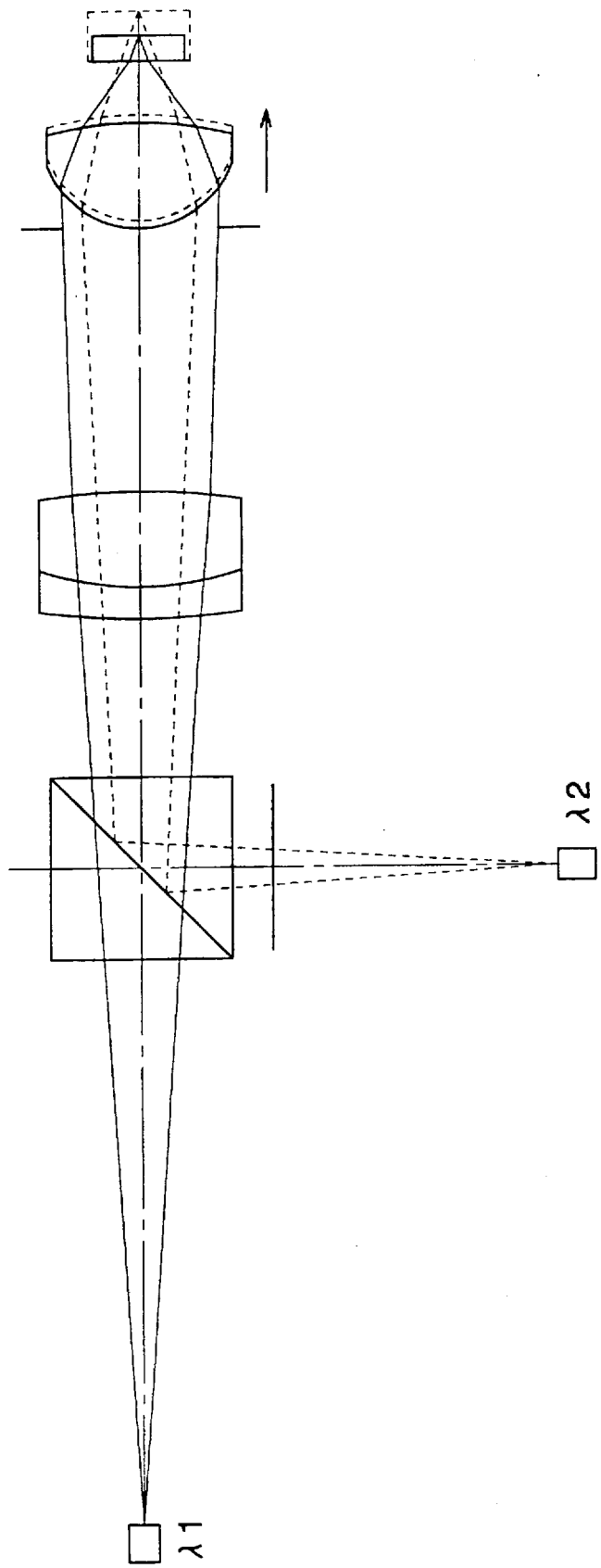
Figure 29:
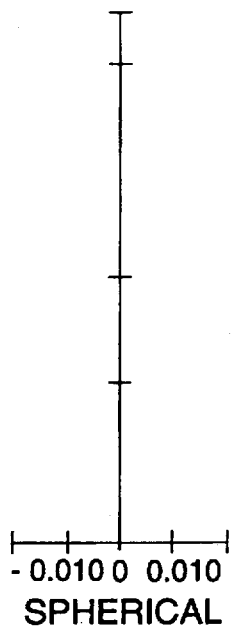
Figure 29:
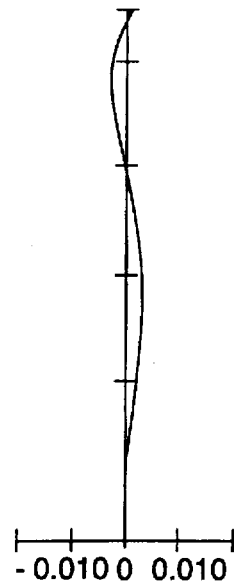
Figure 29:
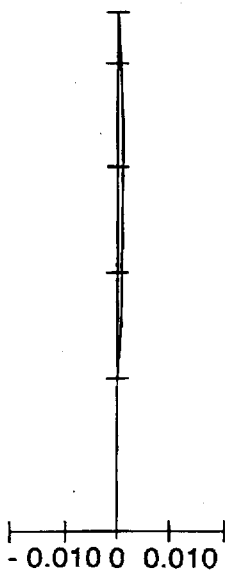
Figure 29:
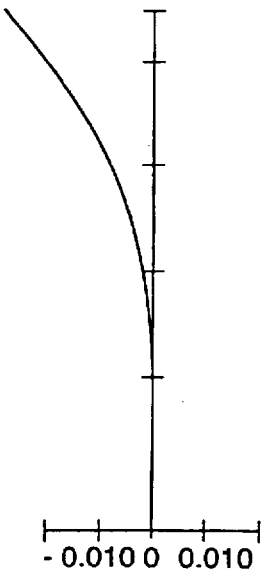

FIG. 28 is a diagram showing how to change a magnification of an objective lens by switching two light sources.

FIGS. 29(a)-1–29(b)-2 represent aberration curve diagrams for the objective lens in the conventional example wherein substrate thicknesses of the optical information recording medium are 0.6 mm and 1.2 mm.

Figure 30:
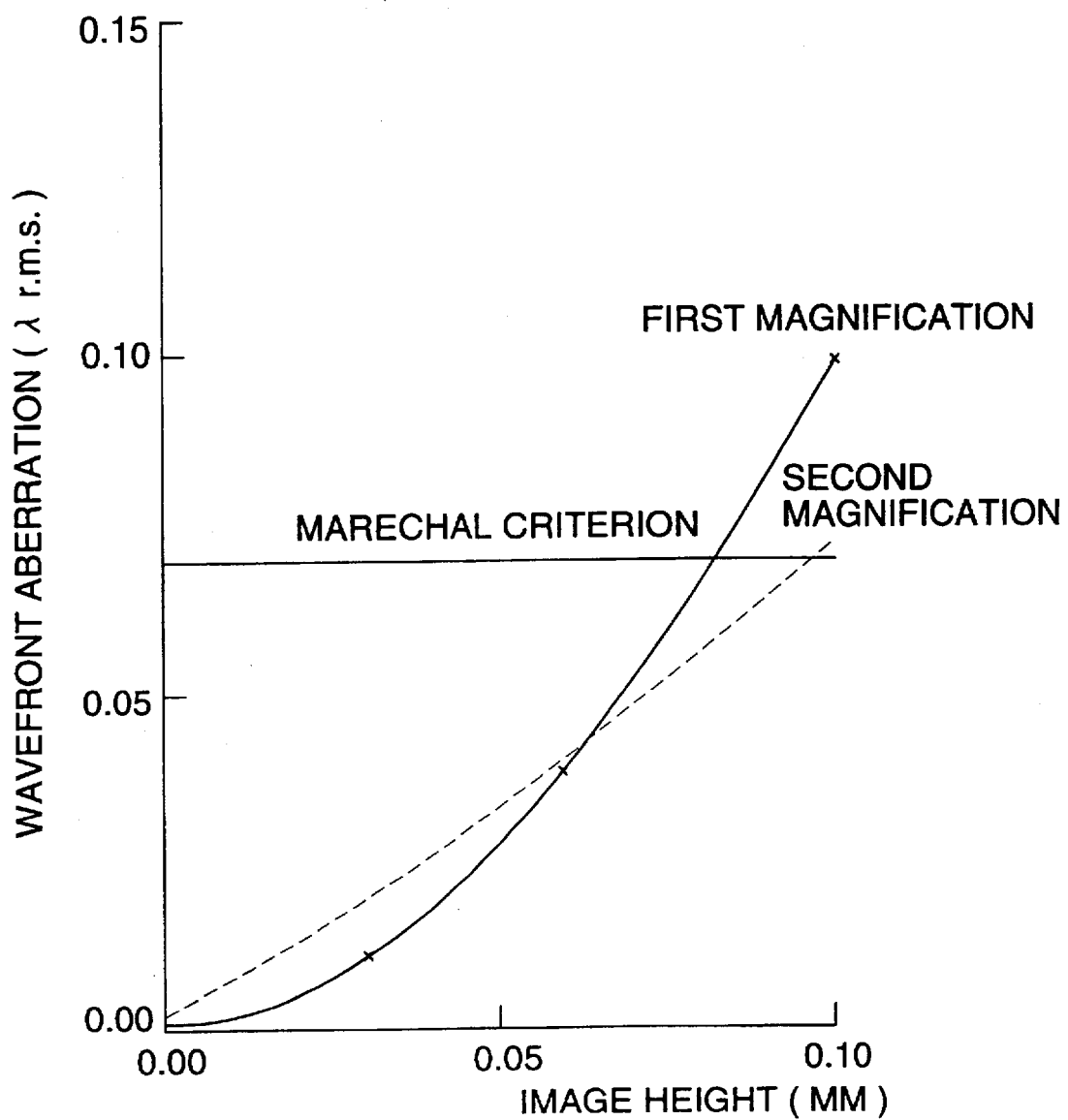

FIG. 30 is a wavefront aberration diagram showing image height characteristics in the conventional example wherein substrate thicknesses of an optical information recording medium are 0.6 mm and 1.2 mm.

Figure 31:
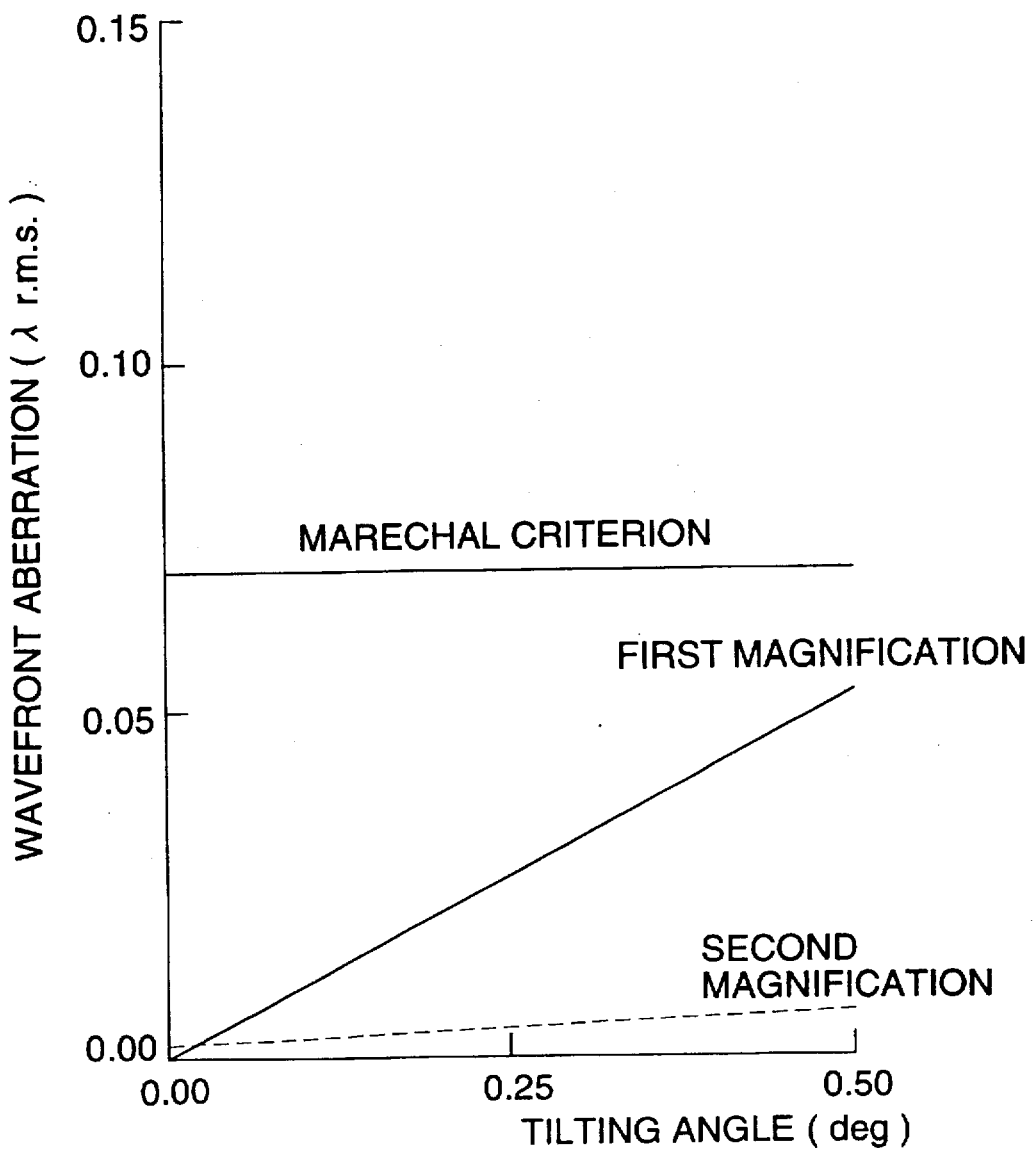

FIG. 31 is a wavefront aberration diagram showing tilt characteristics in the conventional example wherein substrate thicknesses of an optical information recording medium are 0.6 mm and 1.2 mm.

DETAILED DESCRIPTION OF THE PREFERRED EMBODIMENT

Examples

Examples will be explained as follows. In Examples 1–4, $t_1=0.6$ and $t_2=1.2$ were used as a thickness of a transparent substrate, and $NA_1=0.6$ and $NA_2=0.38$ which correspond to the foregoing respectively were used as a numerical aperture. With regard to an aperture stop position which restricts a numerical aperture temporarily, a distance between the aperture stop position and the surface of an objective lens facing a light source was made to be 0.

In Example 5, $t_1=0.6$ and $t_2=1.2$ were used as a thickness of a transparent substrate, and $NA_1=0.58$ and $NA_2=0.55$ which correspond to the foregoing respectively were used as a numerical aperture. In this example, an aperture stop position was arranged to be at the point which is away from the side of an objective lens facing a transparent substrate by 0.05 mm in the direction toward the transparent substrate, and a diameter of an aperture stop for the first magnification was made to be the same as that for the second magnification.

A symbol ri represents a radius of curvature of the i-th surface from a light source, and a distance on an optical axis between the i-th surface and the (i+1)th surface is symbolized by $d_1i$ in the first arrangement and by $d_2i$ in the second arrangement, while ni represents an index of refraction of a medium located between the i-th surface and the (i+1)th surface. An index of refraction of air is assumed to be 1.

An aspherical form of the lens surface is represented by the following expression when k represents a circular cone coefficient, Ai represents an aspheric surface coefficient, and Pi represents an exponent in aspheric surface, in the rectangular coordinate system wherein an apex of the lens surface is an origin and X-axis represents an optical axis.

$$x = \frac{C\phi^2}{1+\sqrt{1-(1+\kappa)C^2\phi^2}} + \Sigma Ai\phi^{Pi}$$

$$\phi = \sqrt{y^2+z^2}, \quad C = 1/r$$

Example 1

Figure 1:
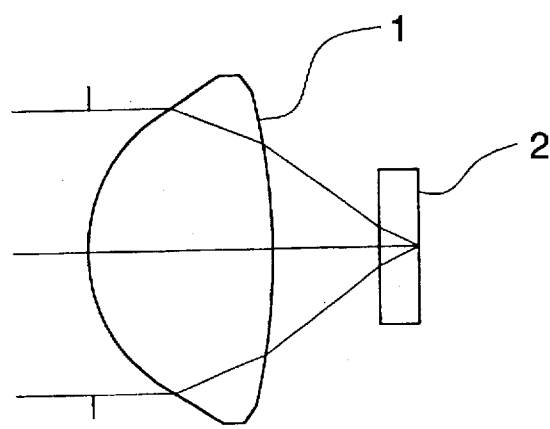
FIG. 1 is a diagram of an optical path in Example 1 of an objective lens wherein substrate thicknesses of an optical information recording medium are 0.6 mm and 1.2 mm.
Figure 1:
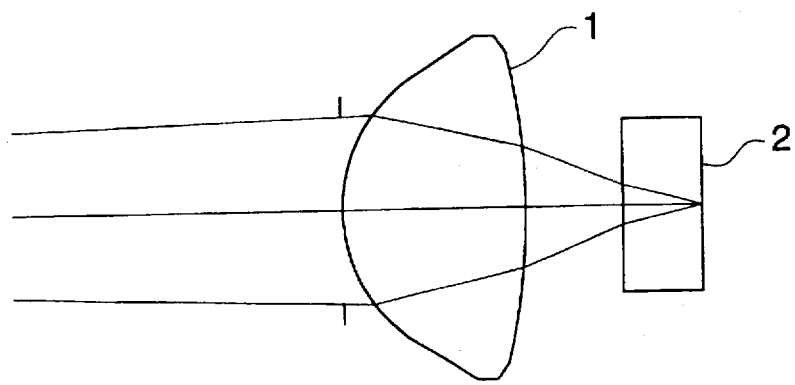
Figure 2:
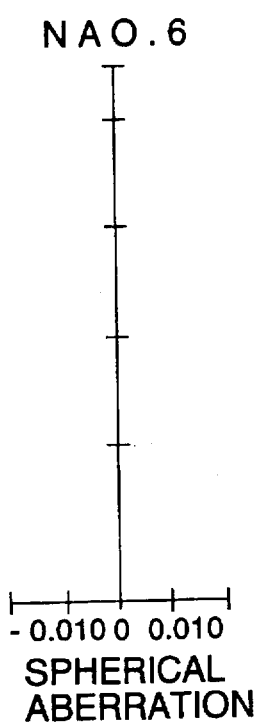
Figure 2:
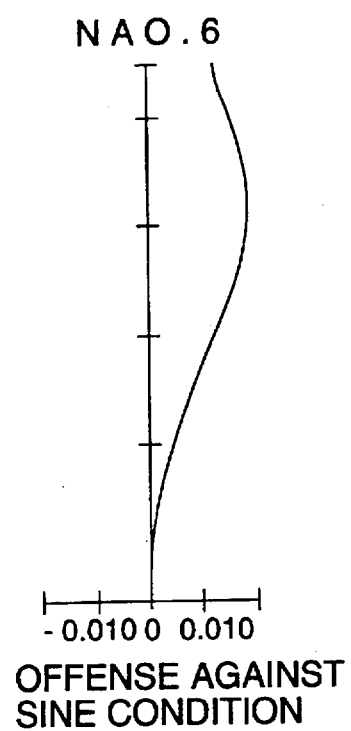
Figure 2:
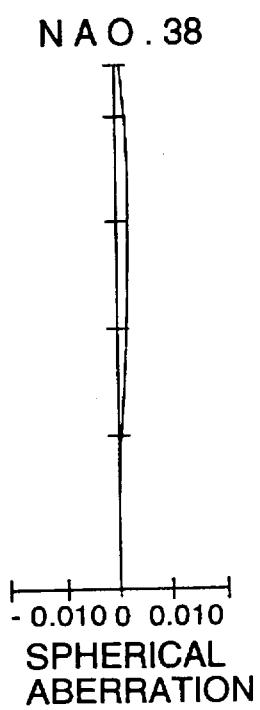
Figure 2:
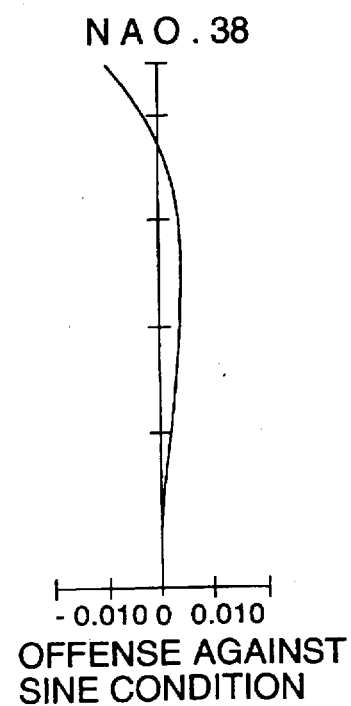
Figure 3:
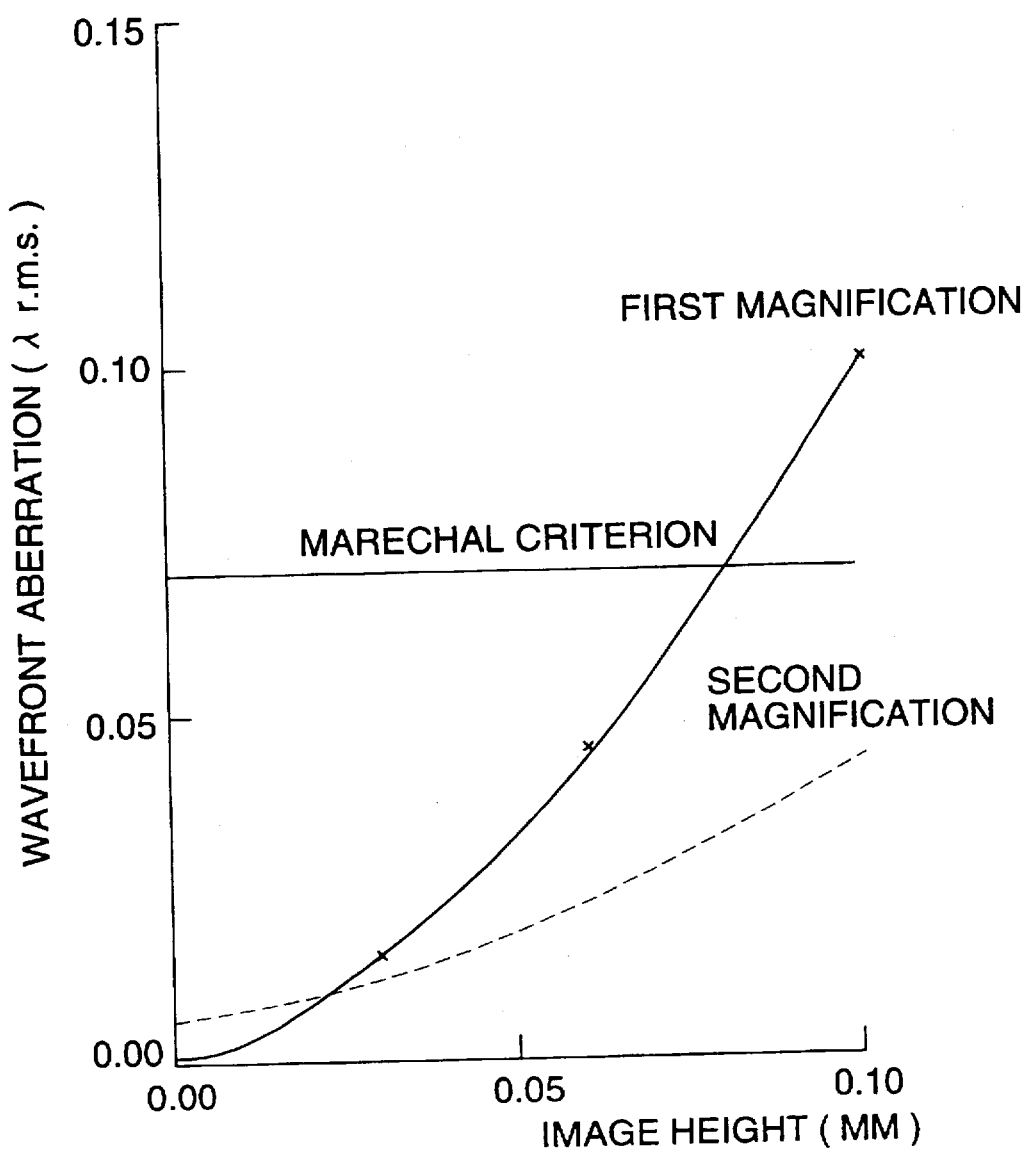
FIG. 3 is a wavefront aberration diagram showing image height characteristics in the Example 1 wherein substrate thicknesses of an optical information recording medium are 0.6 mm and 1.2 mm.
Figure 4:
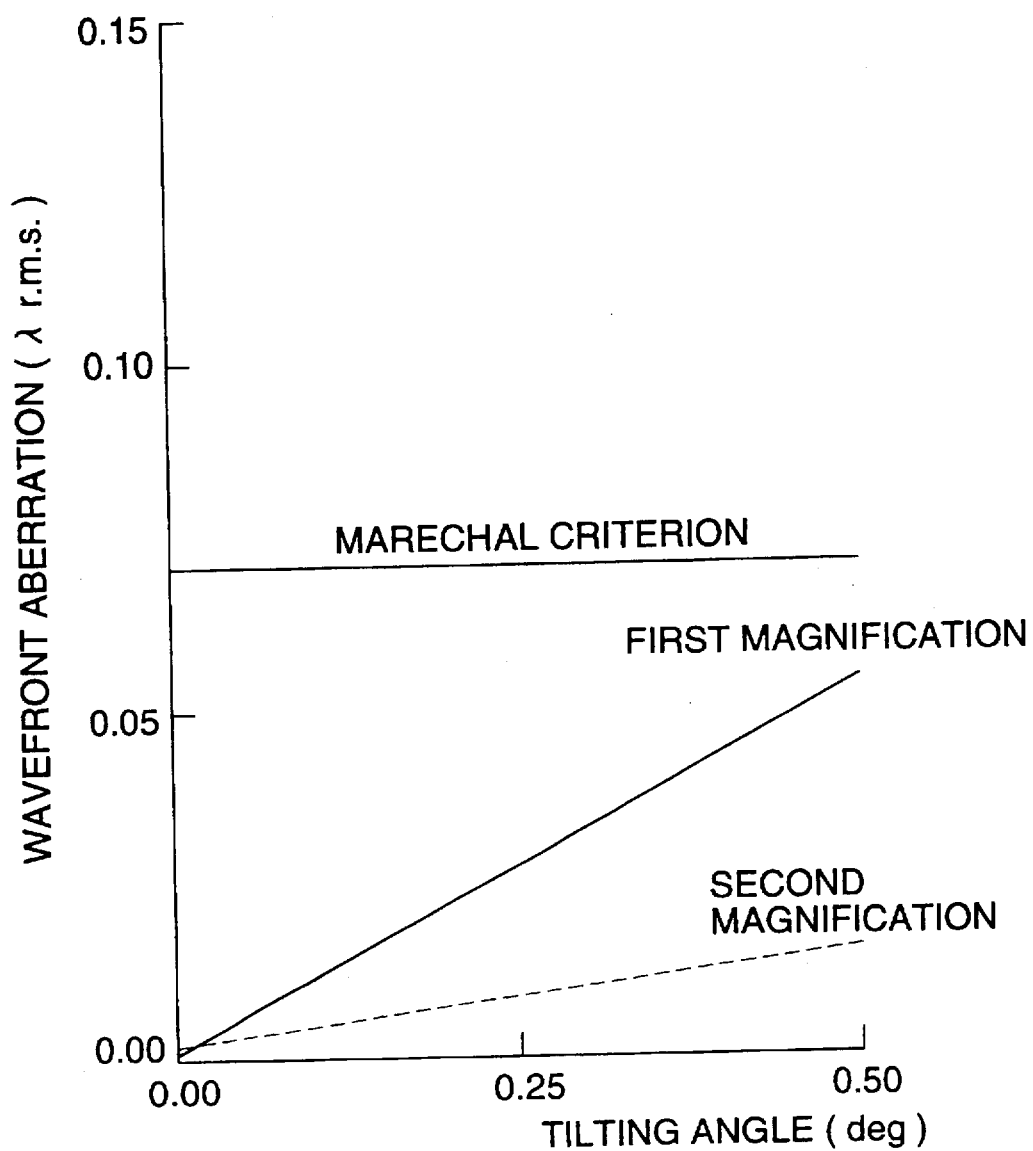
FIG. 4 is a wavefront aberration diagram showing lens tilt characteristics in Example 1 wherein substrate thicknesses of an optical information recording medium are 0.6 mm and 1.2 mm.

Each of these examples is balanced in terms of off-axis-characteristics at each of the first magnification and the second magnification. An optical arrangement at each magnification is shown in each of FIGS. 1(a) and 1(b) wherein the numeral 1 represents an objective lens, and 2 represents substrates each being different in thickness in an optical information recording medium. An aberration diagram of spherical aberration and offense against sine condition both for the first magnification are shown respectively in FIGS. 2(a)-1 and 2(a)-2, and an aberration diagram of spherical aberration and offense against sine condition both for the second magnification are shown respectively in FIGS. 2(b)-a and (b)-2, while, image height characteristics are shown in FIG. 3 and lens tilt characteristics are shown in FIG. 4.

f=3.360755

First magnification $m_1=0.0$ $NA_1:0.60$ Diameter of aperture $\phi_1:4.050$

Second magnification $m_2=-0.0635$ $NA_2:0.38$ Diameter of aperture $\phi_2:2.684$

| i | ri | $d_1i$ | $d_2i$ | ni |
|---|-----|------|------|---------|
| 1 | 2.065 | 2.60 | 2.60 | 1.49810 |
| 2 | −5.140 | 1.57 | 1.408 | |
| 3 | ∞ | 0.60 | 1.2 | 1.58000 |
| 4 | ∞ | | | |

Aspherical data
First surface $\kappa = -8.48180 \times 10^{-1}$
$A_1 = 5.09770 \times 10^{-3}$    $P_1 = 4.0000$
$A_2 = 4.12210 \times 10^{-4}$    $P_2 = 6.0000$
$A_3 = 2.17950 \times 10^{-5}$    $P_3 = 8.0000$
$A_4 = -5.86930 \times 10^{-6}$    $P_4 = 10.0000$ Second surface $\kappa = -1.00300 \times 10$
$A_1 = 2.23590 \times 10^{-2}$    $P_1 = 4.0000$
$A_2 = -8.09280 \times 10^{-3}$    $P_2 = 6.0000$
$A_3 = 1.56230 \times 10^{-3}$    $P_3 = 8.0000$
$A_4 = -1.30870 \times 10^{-4}$    $P_4 = 10.0000$ Values of offense against sine condition for $NA_1$ and $NA_2$ at the first magnification are as follows.

$SC\ (m_1=0:NA_1=0.60)/f=0.0038$ $SC\ (m_1=0:NA_2=0.38)/f=0.0052$

In the first magnification, both off-axis characteristics and tilt characteristics are on the levels which are mostly the same as the levels in the conventional example. Off-axis characteristics at the second magnification in the present example are improved to about a half of the conventional ones. With regard to tilt characteristics, the change thereof in the present example is greater at the second magnification. However, the tilt characteristics at the second magnification are not problematic if the tilt at the first magnification is restricted in the course of adjustment, because the same objective lens is used for both the first magnification and the second magnification and wavefront aberration caused by the tilt at the second magnification affects less than that at the first magnification.

Example 2 f=3.0679968

First magnification $m_1=0.0$ $NA_1:0.60$ Diameter of aperture $\phi_1:3.700$

Second magnification $m_2=-0.0606$ $NA_2:0.38$ Diameter of aperture $\phi_2:2.439$

| i | ri | $d_1i$ | $d_2i$ | ni |
|---|---|---|---|---|
| 1 | 1.929 | 2.60 | 2.60 | 1.49810 |
| 2 | −4.058 | 1.313 | 1.120 | |
| 3 | ∞ | 0.60 | 1.2 | 1.58000 |
| 4 | ∞ | | | |

Figure 5:
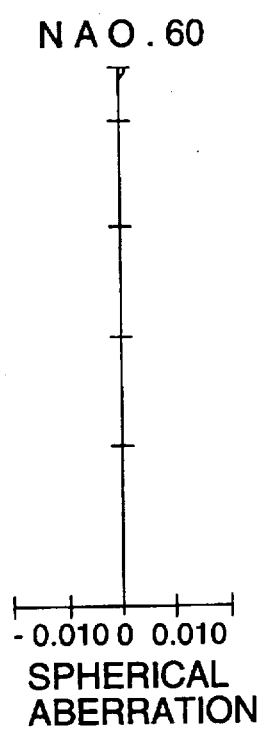
Figure 5:
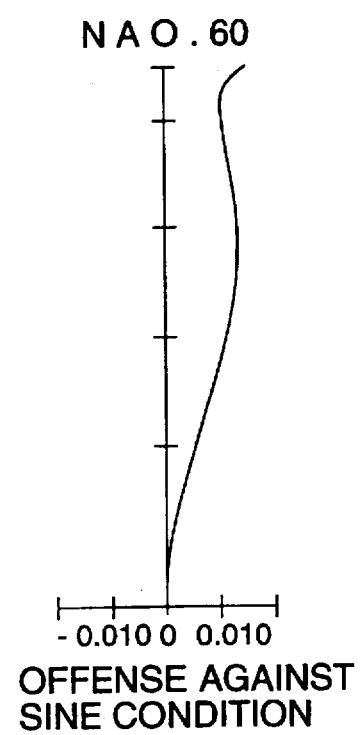
Figure 5:
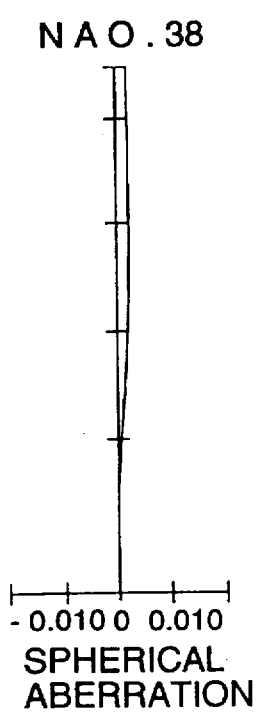
Figure 5:
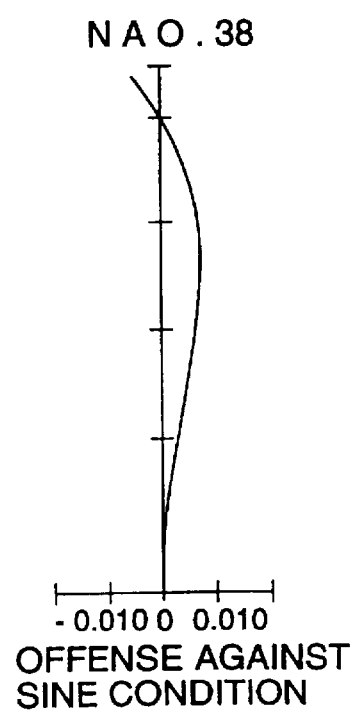

Aspherical data
First surface $\kappa = -5.58980 \times 10^{-1}$
$A_1 = 1.18930 \times 10^{-3}$    $P_1 = 4.0000$
$A_2 = -1.93120 \times 10^{-4}$    $P_2 = 6.0000$
$A_3 = 4.04970 \times 10^{-6}$    $P_3 = 8.0000$
$A_4 = -2.69980 \times 10^{-5}$    $P_4 = 10.0000$ Second surface $\kappa = -2.41900 \times 10$
$A_1 = 6.61370 \times 10^{-3}$    $P_1 = 4.0000$
$A_2 = -4.25130 \times 10^{-3}$    $P_2 = 6.0000$
$A_3 = 7.26420 \times 10^{-4}$    $P_3 = 8.0000$
$A_4 = -3.99040 \times 10^{-6}$    $P_4 = 10.0000$ This example is also balanced in terms of off-axis-characteristics at each of the first magnification and the second magnification, in the same manner as in Example 1. An aberration diagram indicating spherical aberration and that indicating offense against sine condition both for the first magnification are shown respectively in FIGS. 5(a)-1 and 5(a)-2, and an aberration diagram indicating spherical aberration and that indicating offense against sine condition both for the second magnification are shown respectively in FIGS. 5(b)-1 and 5(b)-2.

Values of offense against sine condition for $NA_1$ and $NA_2$ at the first magnification are as follows.

$SC\ (m_1=0:NA_1=0.60)/f=0.0047$ $SC\ (m_1=0:NA_2=0.38)/f=0.0042$

Figure 6:
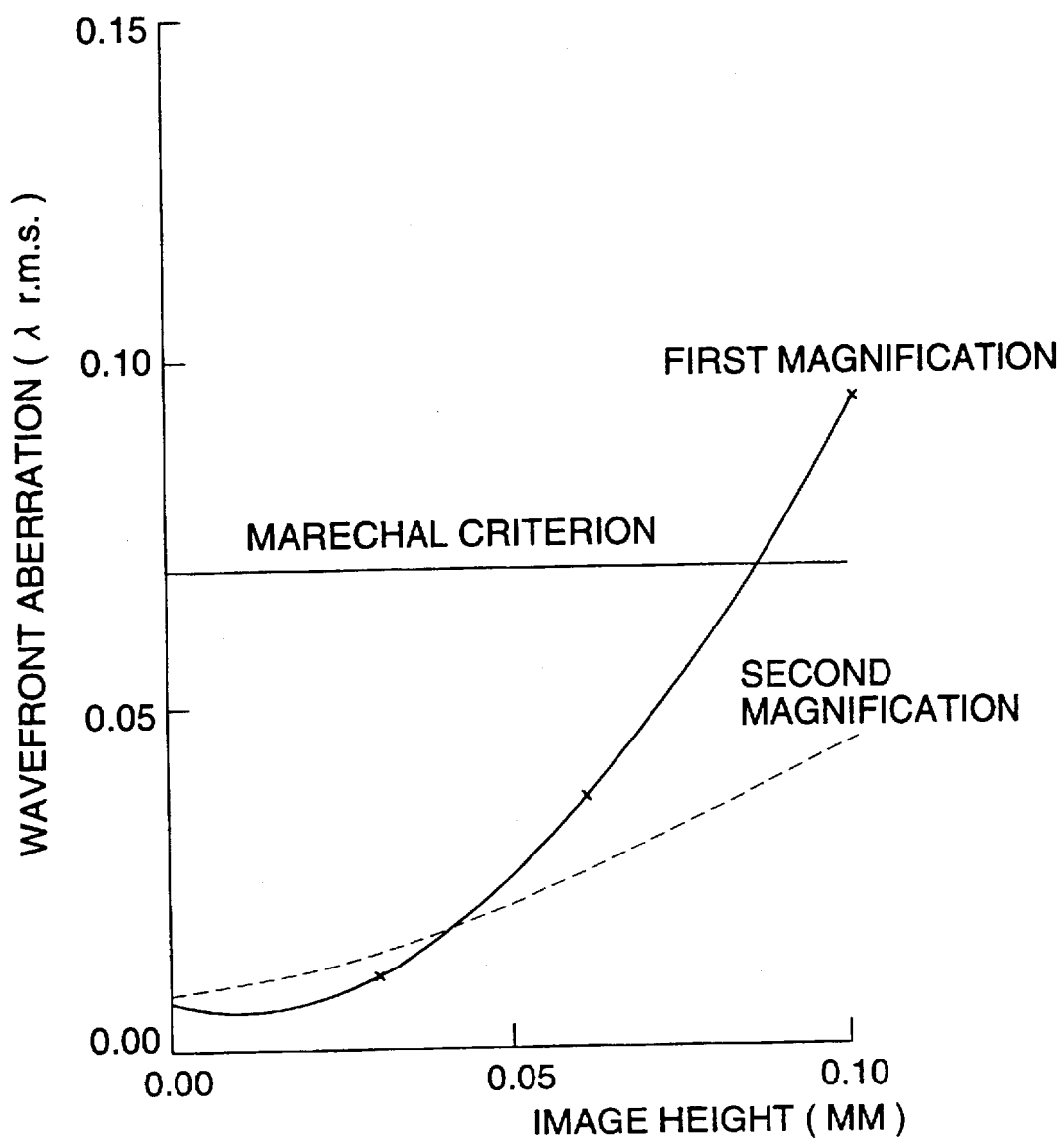
FIG. 6 is a wavefront aberration diagram showing image height characteristics in the Example 2 wherein substrate thicknesses of an optical information recording medium are 0.6 mm and 1.2 mm.
Figure 7:
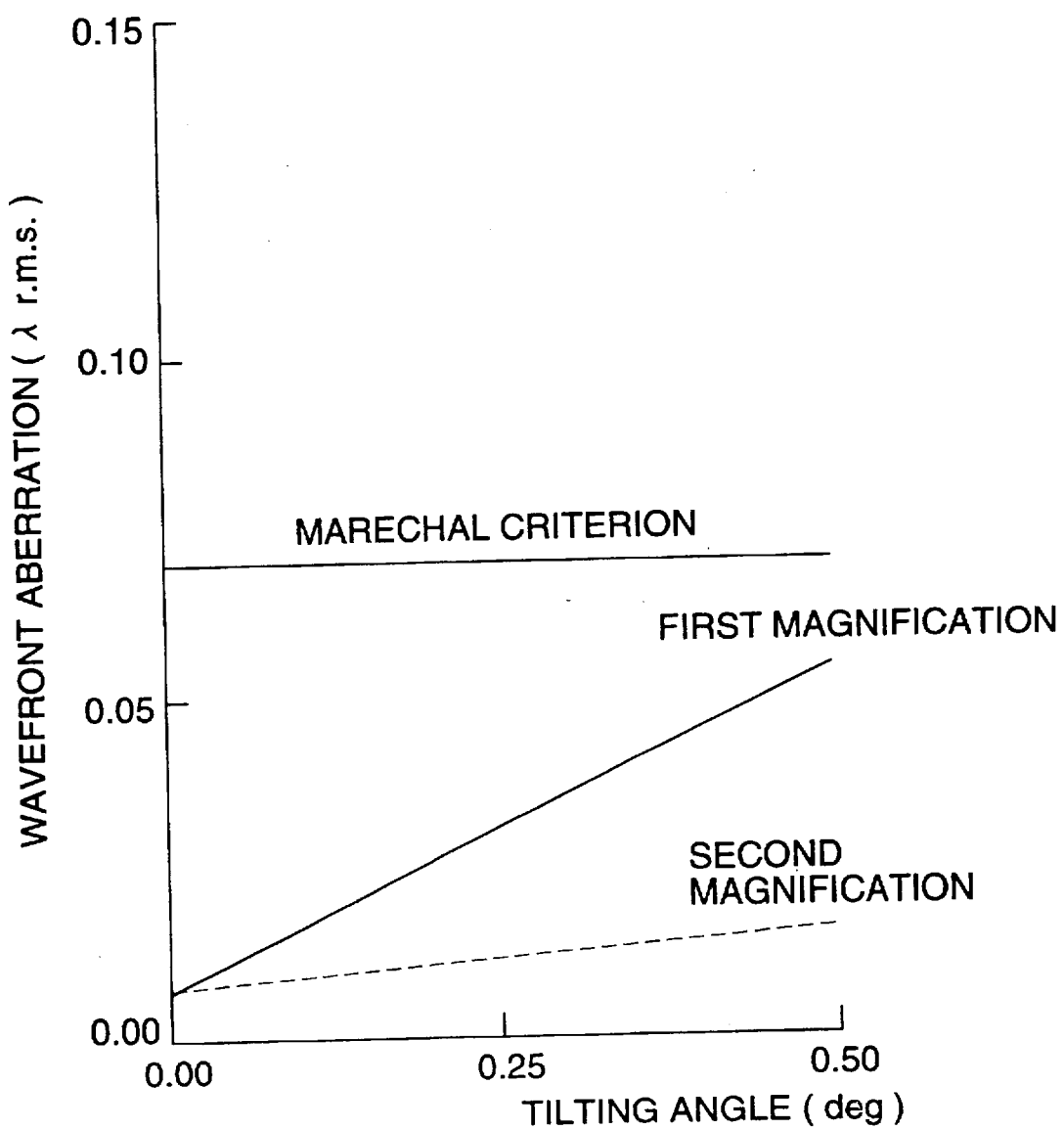
FIG. 7 is a wavefront aberration diagram showing lens tilt characteristics in Example 2 wherein substrate thicknesses of an optical information recording medium are 0.6 mm and 1.2 mm.

With regard to the present example, its wavefront aberration diagram indicating off-axis characteristics (image height characteristics) is shown in FIG. 6, and a wavefront aberration diagram indicating tilt characteristics is shown in FIG. 7.

Example 3 f=3.360755

First magnification $m_1=0.0$ $NA_1:0.60$ Diameter of aperture $\phi_1:4.034$

Second magnification $m_2=-0.0597$ $NA_2:0.38$ Diameter of aperture $\phi_2:2.676$

| i | ri | $d_1i$ | $d_2i$ | ni |
|---|---|---|---|---|
| 1 | 2.080 | 2.70 | 2.70 | 1.49810 |
| 2 | −4.875 | 1.53 | 1.351 | |
| 3 | ∞ | 0.60 | 1.2 | 1.58000 |
| 4 | ∞ | | | |

Figure 8:
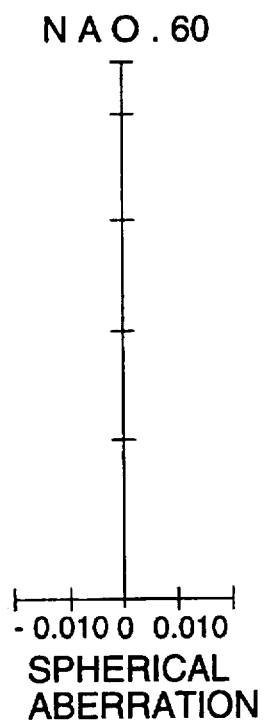
FIGS. 8 (a)-1-8(b)-2 represent aberration curve diagrams for the objective lens in Example 3 wherein substrate thicknesses of the optical information recording medium are 0.6 mm and 1.2 mm.
Figure 8:
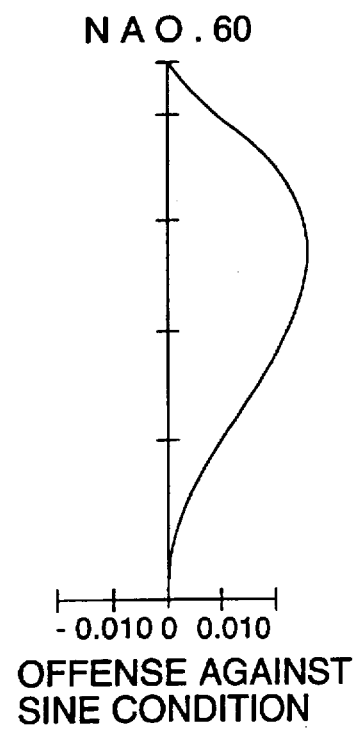
Figure 8:
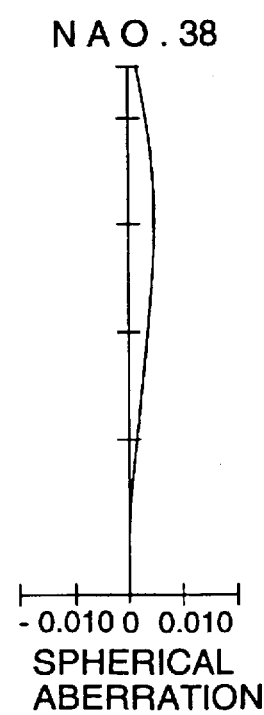
Figure 8:
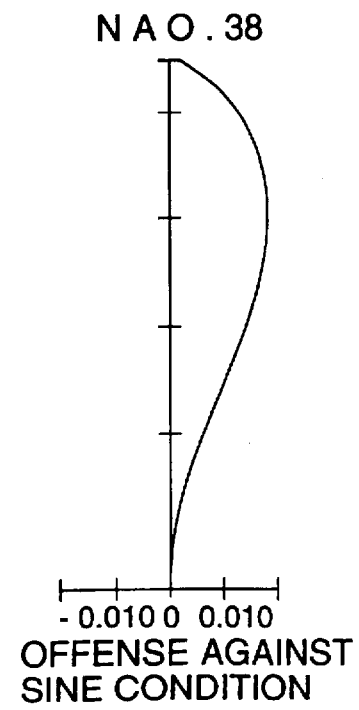

Aspherical data
First surface $\kappa = -8.94520 \times 10^{-1}$
$A_1 = 6.39060 \times 10^{-3}$    $P_1 = 4.0000$
$A_2 = -3.16090 \times 10^{-4}$    $P_2 = 6.0000$
$A_3 = 1.76490 \times 10^{-5}$    $P_3 = 8.0000$
$A_4 = -1.58940 \times 10^{-5}$    $P_4 = 10.0000$ Second surface $\kappa = -2.03250 \times 10$
$A_1 = 1.98900 \times 10^{-2}$    $P_1 = 4.0000$
$A_2 = -1.11890 \times 10^{-2}$    $P_2 = 6.0000$
$A_3 = 2.69710 \times 10^{-3}$    $P_3 = 8.0000$
$A_4 = -2.64920 \times 10^{-4}$    $P_4 = 10.0000$ In the present example, tilt characteristics are restricted at the first magnification and off-axis characteristics are restricted at the second magnification. An aberration diagram indicating spherical aberration and that indicating offense against sine condition both for the first magnification are shown respectively in FIGS. 8(a)-1 and 8(a)-2, and an aberration diagram indicating spherical aberration and that indicating offense against sine condition both for the second magnification are shown respectively in FIGS. 8(b)-1 and 8(b)-2.

Values of offense against sine condition for $NA_1$ and $NA_2$ at the first magnification are as follows.

$SC\ (m_1=0:NA_1=0.60)/f=0.0000$ $SC\ (m_1=0:NA_2=0.38)/f=0.0078$

Figure 9:
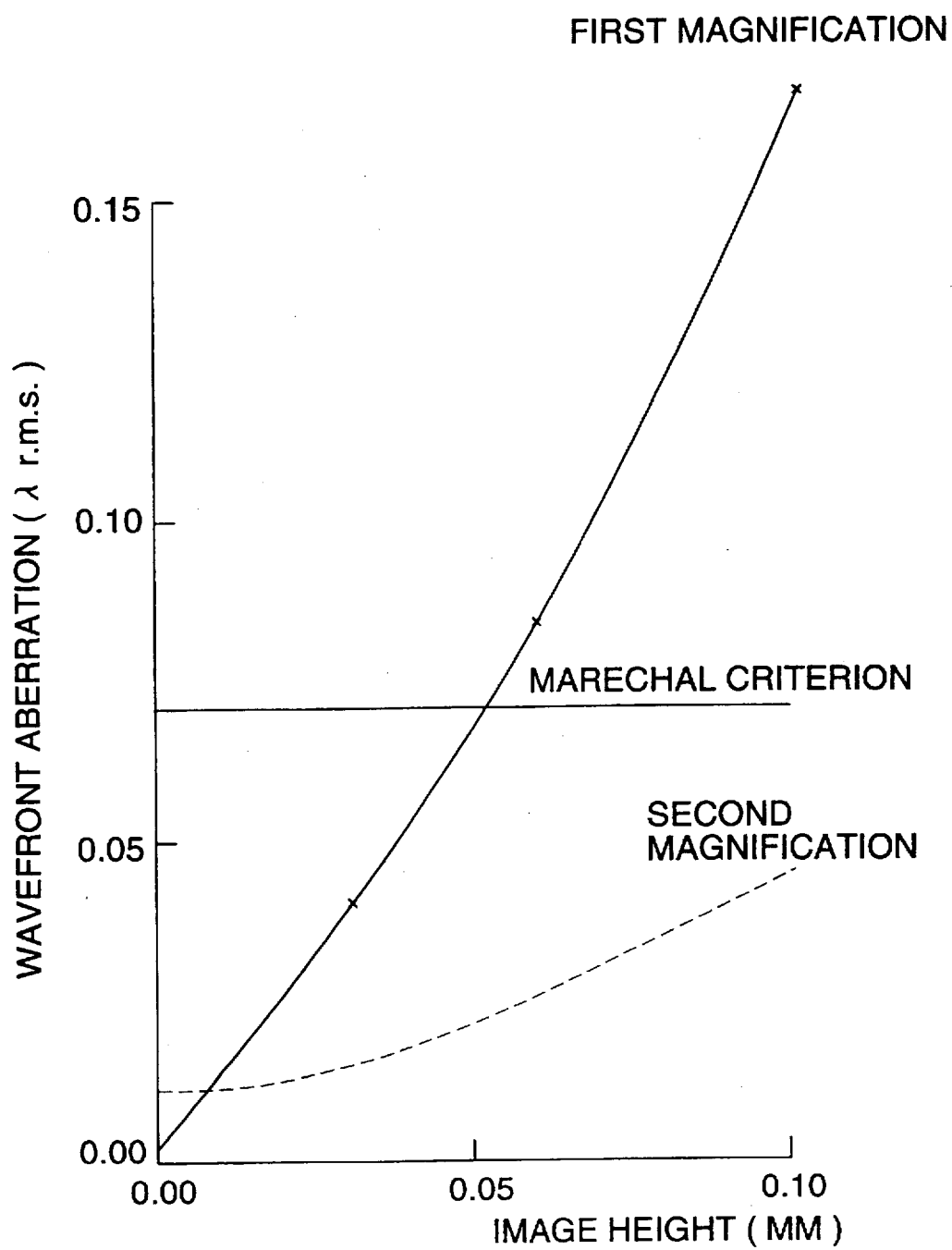
FIG. 9 is a wavefront aberration diagram showing image height characteristics in the Example 3 wherein substrate thicknesses of an optical information recording medium are 0.6 mm and 1.2 mm.
Figure 10:
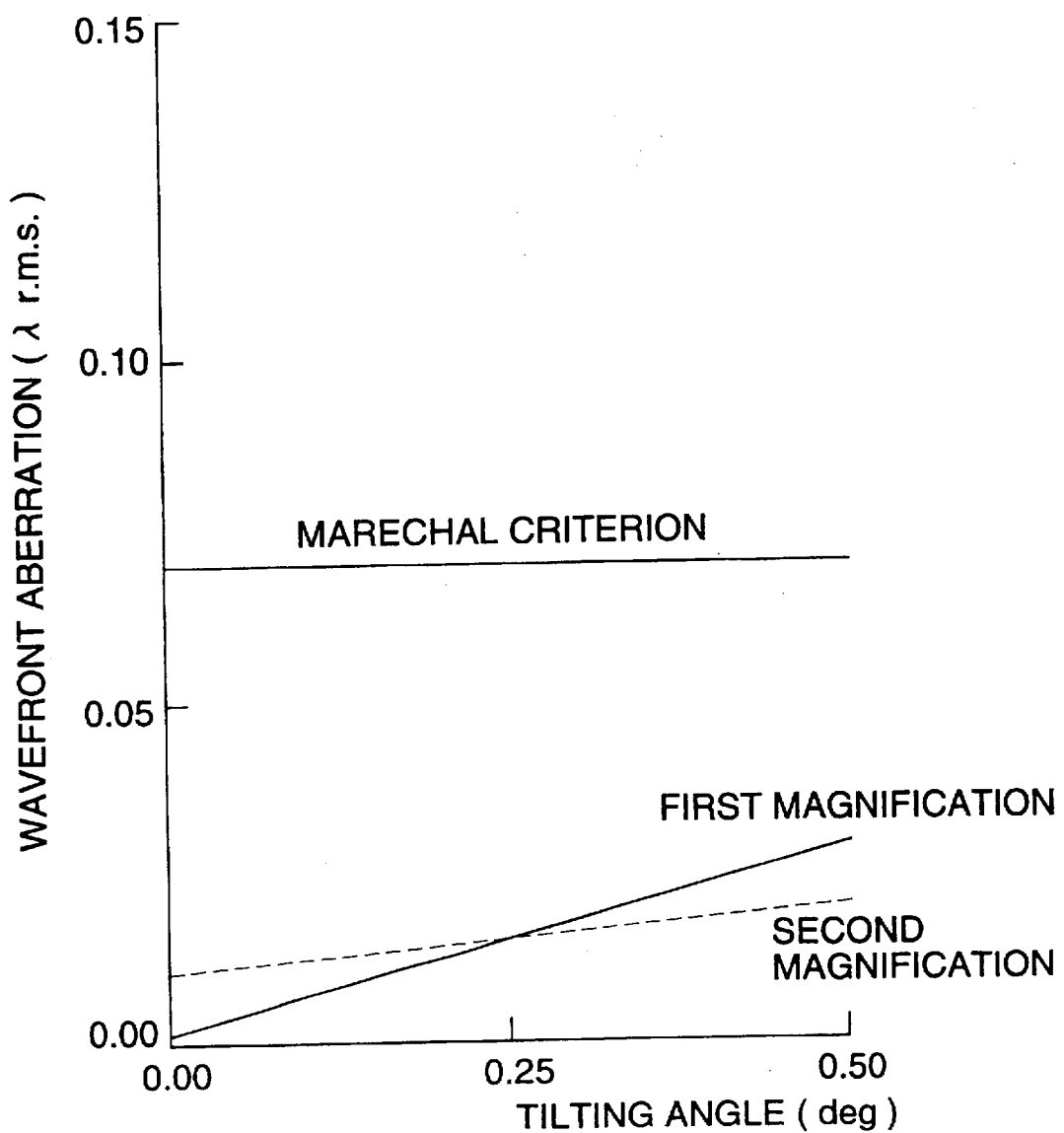
FIG. 10 is a wavefront aberration diagram showing lens tilt characteristics in the Example 3 wherein substrate thicknesses of an optical information recording medium are 0.6 mm and 1.2 mm.

With regard to the present example, its wavefront aberration diagram indicating off-axis characteristics is shown in FIG. 9, and a wavefront aberration diagram indicating tilt characteristics is shown in FIG. 10.

In the first magnification, tilt characteristics in this example are restricted to about a half of the conventional ones satisfying sine condition at each NA at the first magnification (SA=0). Off-axis characteristics are considerably changed, but it is not a problem even when tracking is conducted when an object is placed to form infinity for an objective lens, because no image height exists.

Off-axis characteristics at the second magnification in the present example are improved to about a half of those in the conventional example. With regard to tilt characteristics at the second magnification, the change thereof in the present example is greater. However, the tilt characteristics at the second magnification are hot problematic if the tilt at the first magnification is restricted in the course of adjustment, because the same objective lens is used actually for both the first magnification and the second magnification and wavefront aberration caused by the tilt at the second magnification affects less than that at the first magnification.

Example 4 f=3.3607550

First magnification $m_1=0.0$ $NA_1:0.60$ Diameter of aperture $\phi_1:4.116$

Second magnification $m_2=-0.0742$ $NA_2:0.38$ Diameter of aperture $\phi_2:2.706$

| i | ri | $d_1i$ | $d_2i$ | ni |
|---|---|---|---|---|
| 1 | 2.138 | 2.70 | 2.70 | 1.49810 |
| 2 | −4.473 | 1.57 | 1.44 | |
| 3 | ∞ | 0.60 | 1.2 | 1.58000 |
| 4 | ∞ | | | |

Figure 11:
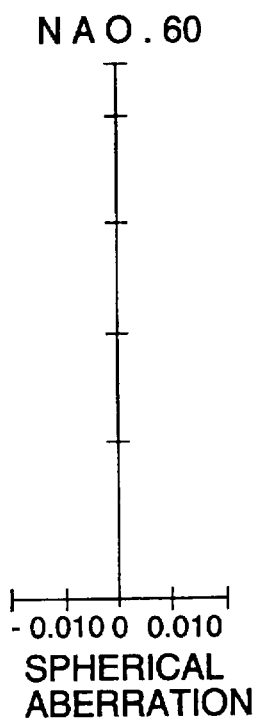
Figure 11:
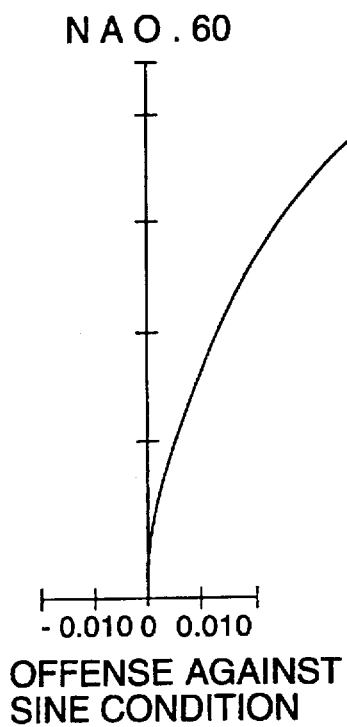
Figure 11:
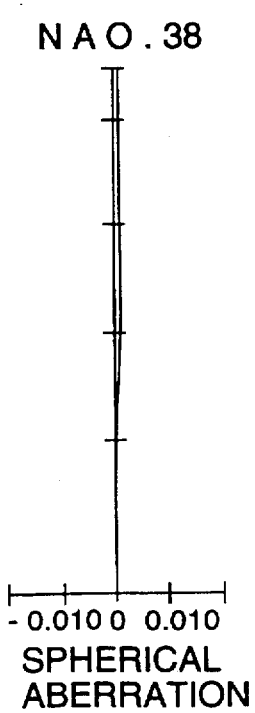
Figure 11:
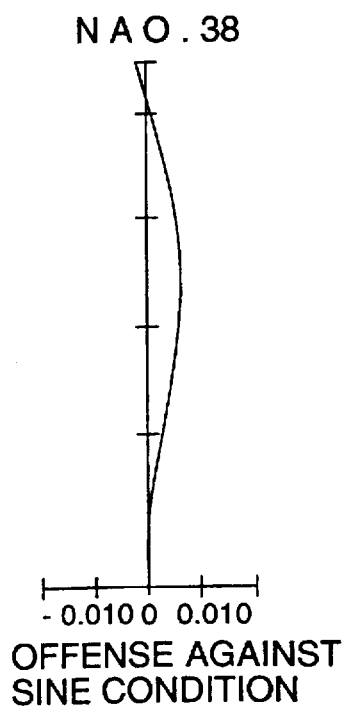

Aspherical data
First surface $\kappa = -4.88730 \times 10^{-1}$
$A_1 = -5.09640 \times 10^{-4}$    $P_1 = 4.0000$
$A_2 = -2.71610 \times 10^{-4}$    $P_2 = 6.0000$
$A_3 = -9.27400 \times 10^{-6}$    $P_3 = 8.0000$
$A_4 = -2.53900 \times 10^{-6}$    $P_4 = 10.0000$ Second surface $\kappa = -2.24560 \times 10$
$A_1 = 7.73040 \times 10^{-4}$    $P_1 = 4.0000$
$A_2 = 4.12380 \times 10^{-4}$    $P_2 = 6.0000$
$A_3 = -8.54530 \times 10^{-5}$    $P_3 = 8.0000$
$A_4 = 8.71830 \times 10^{-6}$    $P_4 = 10.0000$ The present example is one wherein off-axis characteristics are restricted especially at the second magnification. An aberration diagram indicating spherical aberration and that indicating offense against sine condition both for the first magnification are shown respectively in FIGS. 11(a)-1 and 11(a)-2, and an aberration diagram indicating spherical aberration and that indicating offense against sine condition both for the second magnification are shown respectively in FIGS. 11(b)-1 and 11(b)-2.

Values of offense against sine condition for $NA_1$ and $NA_2$ at the first magnification are as follows.

$SC\ (m_1=0:NA_1=0.60)/f=0.0212$ $SC\ (m_1=0:NA_2=0.38)/f=0.0065$

Figure 12:
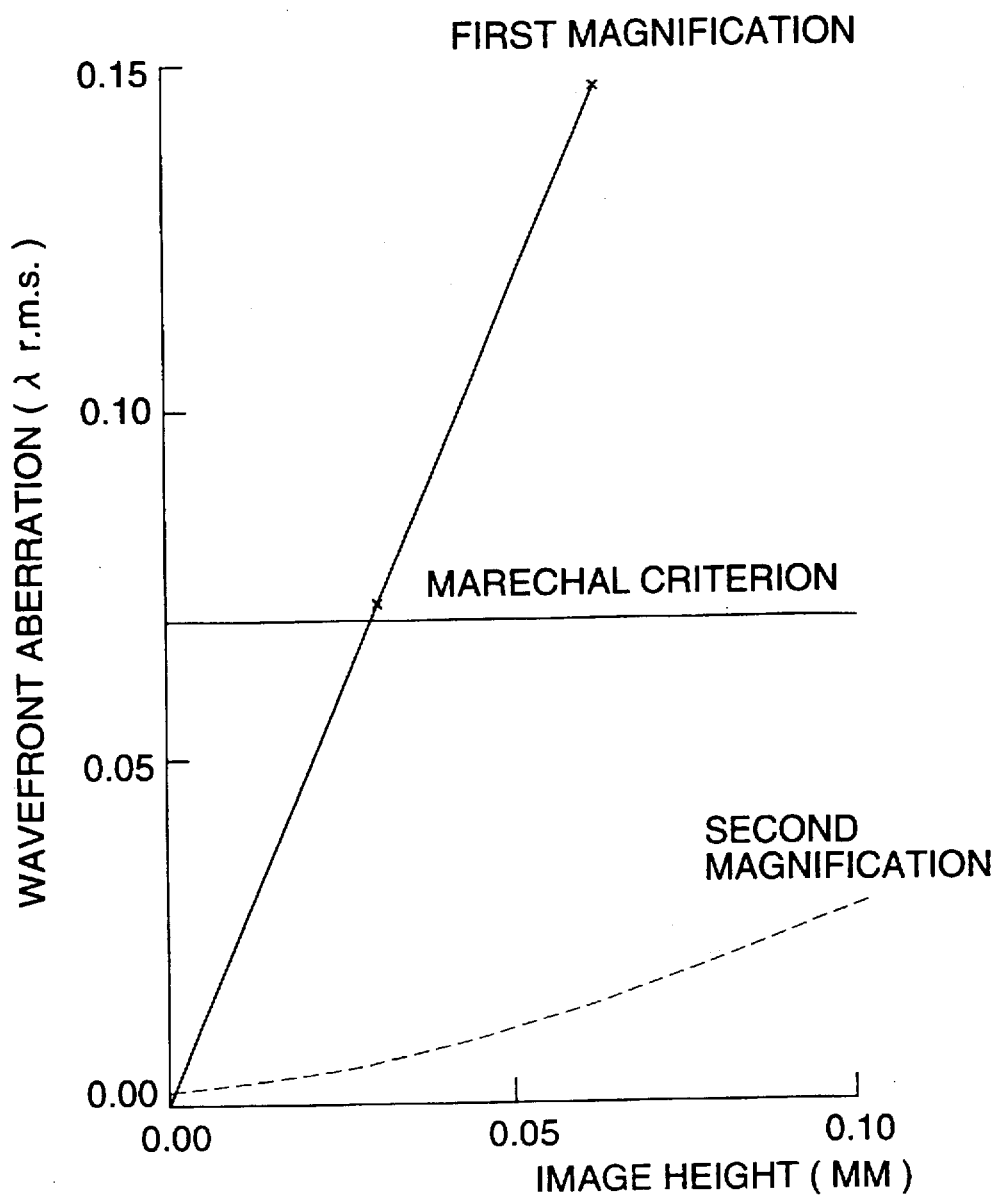
FIG. 12 is a wavefront aberration diagram showing image height characteristics in the Example 4 wherein substrate thicknesses of an optical information recording medium are 0.6 mm and 1.2 mm.
Figure 13:
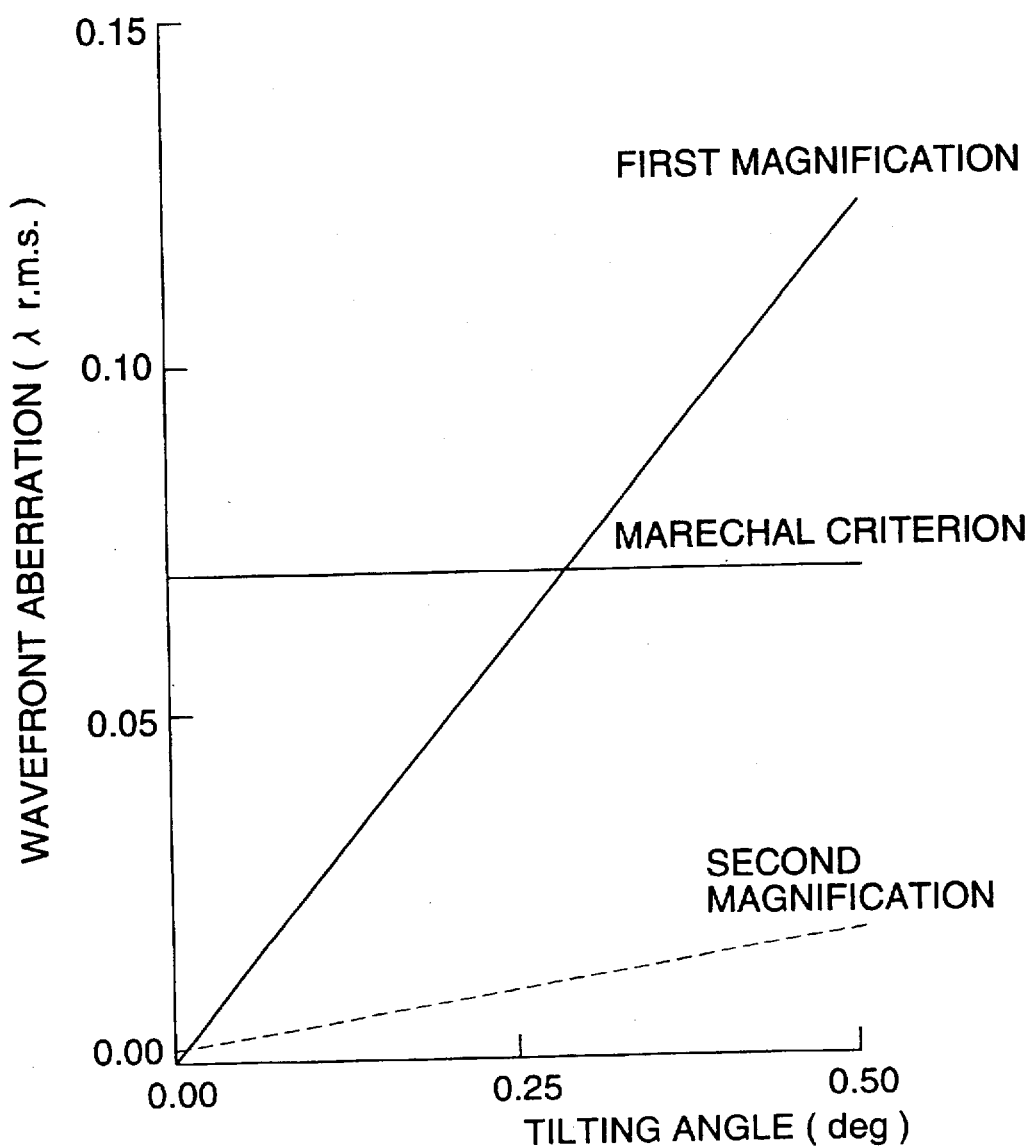
FIG. 13 is a wavefront aberration diagram showing lens tilt characteristics in the Example 4 wherein substrate thicknesses of an optical information recording medium are 0.6 mm and 1.2 mm.
Figure 14:
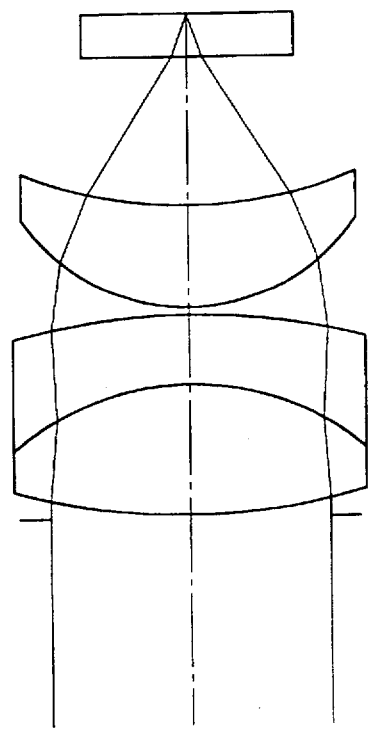
FIG. 14 shows an example of a glass combination lens used as an objective lens.
Figure 15:
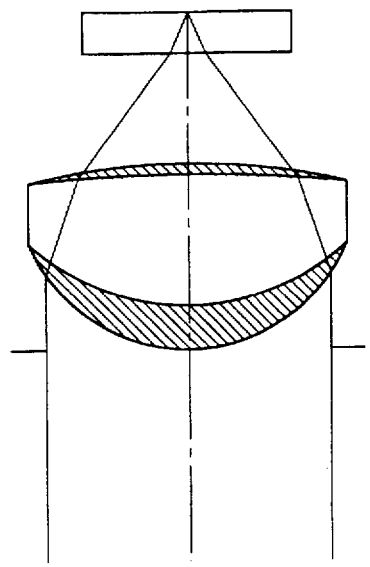
FIG. 15 shows an example of a plastic-glass hybrid lens used as an objective lens.
Figure 16:
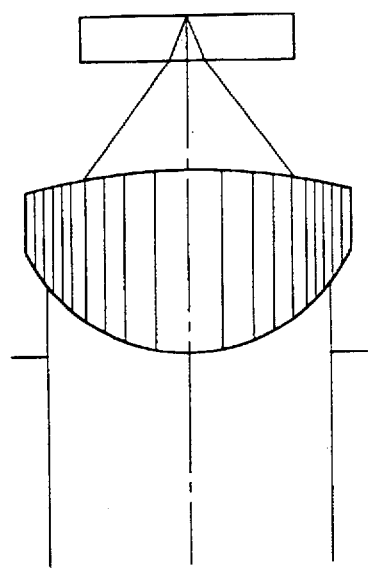
FIG. 16 shows an example of an unhomogeneous index of refraction lens used as an objective lens.
Figure 17:
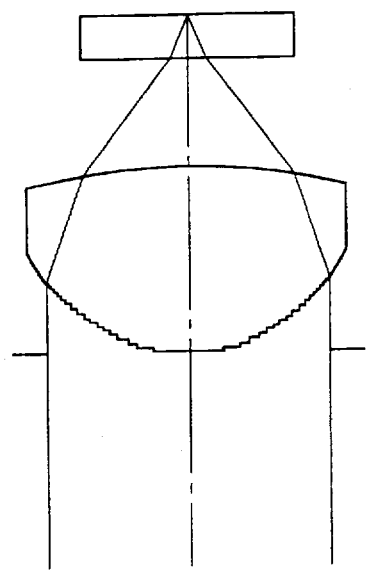
FIG. 17 shows an example of a diffraction lens used as an objective lens.

With regard to the present example, its wavefront aberration diagram indicating off-axis characteristics is shown in FIG. 12, and a wavefront aberration diagram indicating tilt characteristics is shown in FIG. 13.

Example 5 f=3.3607544

First magnification $m_1=0.0$ $NA_1:0.58$ Diameter of aperture $\phi_1:2.71$

Second magnification $m_2=-0.0561$ $NA_2:0.55$ Diameter of aperture $\phi_2:2.71$

| i | ri | $d_1i$ | $d_2i$ | ni |
|---|---|---|---|---|
| 1 | 2.130 | 2.6 | 2.6 | 1.49810 |
| 2 | −4.644 | 0.05 | 0.05 | |
| Aperture stop | ∞ | 1.567 | 1.376 | |
| 3 | ∞ | 0.60 | 1.20 | 1.58000 |
| 4 | ∞ | | | |

Figure 18:
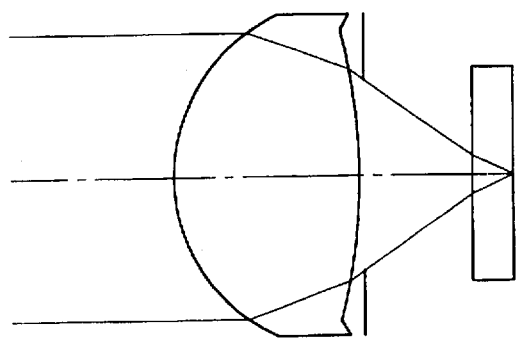
FIGS. 18(a) and 18(b) represent examples showing how an aperture stop is arranged in each of the first magnification and the second magnification in Example 5.
Figure 18:
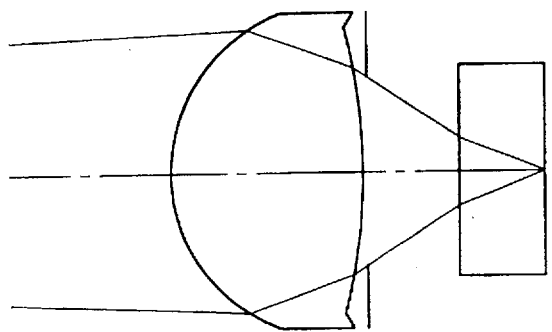

Aspherical data
First surface $\kappa = -5.97500 \times 10^{-1}$
$A_1 = 5.25390 \times 10^{-3}$    $P_1 = 4.0000$
$A_2 = -1.95480 \times 10^{-3}$    $P_2 = 6.0000$
$A_3 = 5.76590 \times 10^{-4}$    $P_3 = 8.0000$
$A_4 = -6.32820 \times 10^{-6}$    $P_4 = 10.0000$ Second surface $\kappa = -6.35750 \times 10^{+1}$
$A_1 = -1.31660 \times 10^{-2}$    $P_1 = 4.0000$
$A_2 = 1.05930 \times 10^{-2}$    $P_2 = 6.0000$
$A_3 = -3.46010 \times 10^{-3}$    $P_3 = 8.0000$
$A_4 = -3.94280 \times 10^{-4}$    $P_4 = 10.0000$ The present example is one wherein an aperture stop having the same diameter of aperture is arranged on the side of an objective lens facing a transparent substrate both for the first and second magnifications as shown in FIG. 18, and a numerical aperture for the first magnification is 0.58 and that for the second magnification is as great as 0.55.

Figure 19:
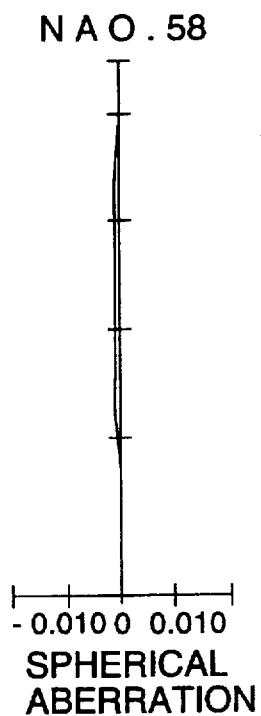
Figure 19:
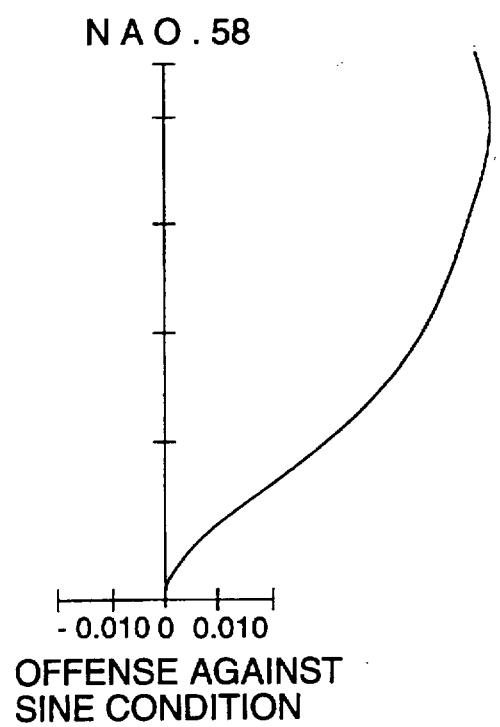
Figure 19:
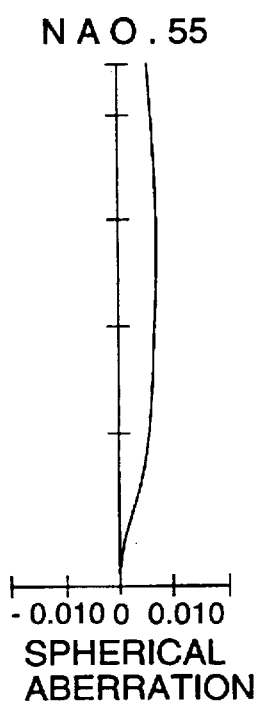
Figure 19:
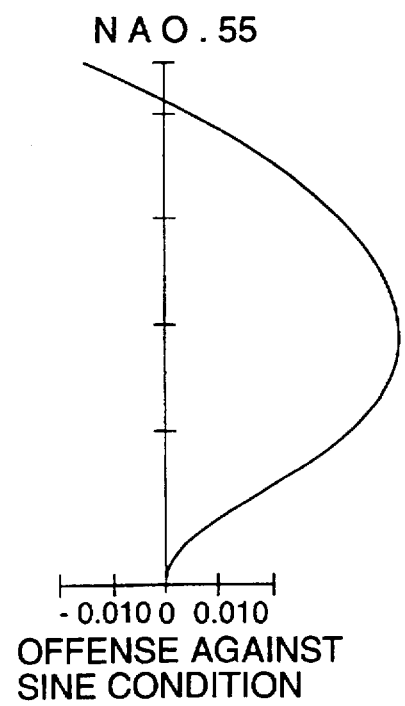

Aberration diagrams indicating spherical aberration and offense against sine condition for both magnifications are shown in FIG. 19. Values of offense against sine condition for $NA_1$ and $NA_2$ at the first magnification are as follows.

$SC(m_1=0, NA_1=0.58)/f=0.0172$ $SC(m_1=0, NA_2=0.55)/f=0.0179$

With regard to the present example, its wavefront aberration diagram indicating off-axis characteristics (image height characteristics) is shown in FIG. 20, and a wavefront aberration diagram indicating tilt characteristics is shown in FIG. 21.

Now, the present example is compared with a conventional lens wherein sine condition is satisfied at the first magnification.

As the conventional lens, a lens designed under the same specifications as those stated above is used, and its focal length is mostly the same as that in Example 5, and lateral magnification $m_1$ of the first objective lens is made to be 0 as in Example 5. An aperture stop position is placed on the point which is away from the side of the first objective lens facing a transparent substrate by 0.05 toward the transparent substrate side as in Example 5 (FIG. 18), and a diameter of aperture is established so that numerical aperture $NA_1$ at the first magnification is 0.58. Further, $NA_2$ is 0.55 under the condition of second lateral magnification $m_2=-0.0558$.

Figure 22:
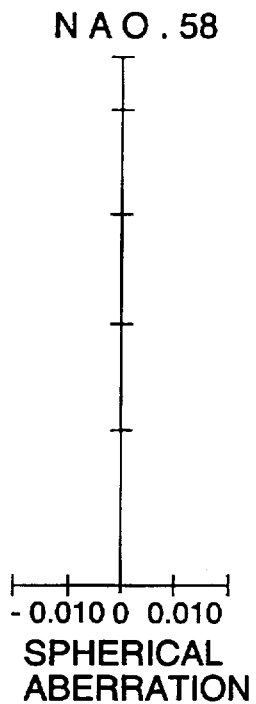
Figure 22:
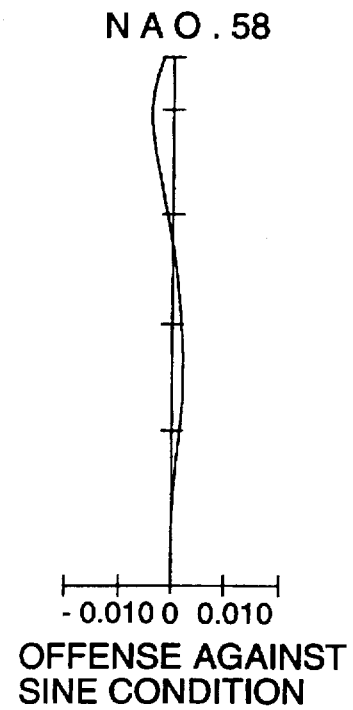
Figure 22:
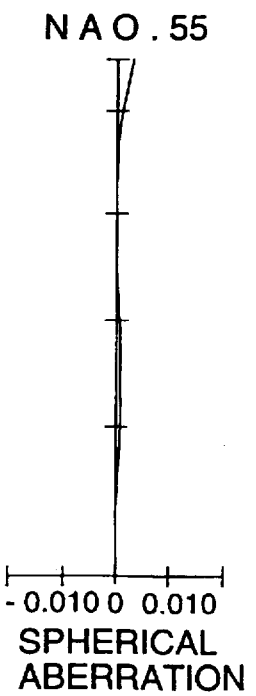
Figure 22:
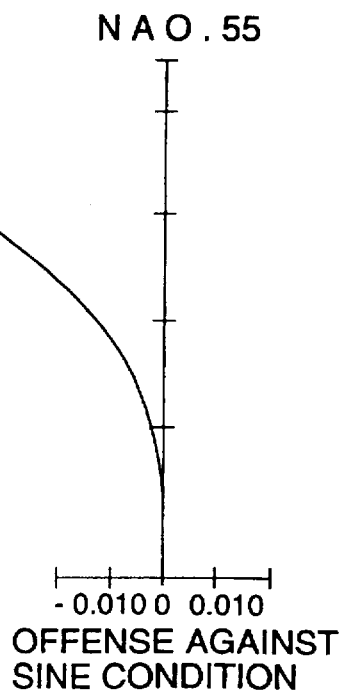

Aberration diagrams indicating spherical aberration and offense against sine condition for both magnifications in the conventional example are shown in FIG. 22, off-axis characteristics are shown in FIG. 23, and tilt characteristics are shown in FIG. 24.

With regard to off-axis characteristics, aforesaid conventional example is compared with Example 5. In the first magnification, wavefront aberration caused by an image height in the conventional example is smaller than that in Example 5 of the invention. However, at first magnification $m_1=0$, no image height is generated even when tracking is conducted because an object is placed to form infinity for an objective lens. Therefore, this difference in off-axis characteristics is not problematic if only an initial adjustment is restricted. Wavefront aberration caused by an image height at the second magnification in Example 5 of the invention is smaller than that in the conventional example.

When a tracking amount is made to be 0.5 mm, it corresponds to an image height of about 0.028, from the value of magnification $m_2$. At this image height, wavefront aberration has exceeded Marechal criterion. In Example 5, however, it is almost within the Marechal criterion.

The present invention has made it possible that recording and reproducing by means of optical disks having different substrate thicknesses are conducted in a single optical pickup device, and its performance is maintained by correcting aberration with lateral magnification of each objective lens taking off-axis characteristics (image height characteristics) and tilt characteristics into consideration when changing its magnification and by keeping balance of the off-axis characteristics even when the lateral magnification of the objective lens is changed.

What is claimed is:

1. An optical system comprising:
   (a) a light source;
   (b) an objective lens for converging luminous flux emitted from the light source onto an information recording surface of an optical information recording medium through a transparent substrate of the optical information recording medium; and
   (c) lateral magnification change means for changing a lateral magnification of the objective lens from a first lateral magnification $m_1$ to a second lateral magnification $m_2$ which is less than $m_1$ according to a thickness of the transparent substrate, wherein an amount of an offense against sine condition $SC(m_1:NA_2)$ represented by the following expression for $NA_2$ at the first lateral magnification $m_1$ of the objective lens satisfies the following conditional expression, $$0.06 \geq SC(m_1:NA_2)/f \geq 0.002$$

and $$SC(m_1:NA_2) = d_2 \cdot \cos(u_2)/NA_2 - (1-m_1) \cdot f$$

wherein f represents a focal length of the objective lens, $NA_2$ represents a numerical aperture of the objective lens at the second lateral magnification $m_2$, $d_2$ represents a height of a ray on a principal plane of the objective lens from an optical axis for the numerical aperture $NA_2$ at the first lateral magnification $m_1$, and $u_2$ represents an incident angle of the ray to the objective lens for the numerical aperture $NA_2$ at the first lateral magnification $m_1$.

2. The optical system of claim 1, wherein the objective lens is a bi-aspherical single lens.

3. The optical system of claim 1, wherein the following condition is satisfied, $$NA_2 \leq 0.55$$

and $$0.03 \cdot f \geq SC(m_1:NA_2) \geq 0.002 \cdot f$$

4. The optical system of claim 1, wherein an amount of an offense against sine condition $SC(m_1:NA_1)$ represented by the following expression for $NA_1$ at the first lateral magnification $m_1$ and $SC(m_1:NA_2)$ satisfy the following condition, $$\{SC(m_1:NA_1) - SC(m_1:NA_2)\} \leq 0.002 \cdot f$$

$$SC(m_1:NA_1) \geq -0.002 \cdot f$$

and $$SC(m_1:NA_1) = d_1 \cdot \cos(u_1)/NA_1 - (1-m_1) \cdot f$$

where $NA_1$ represents a numerical aperture of the objective lens at the first lateral magnification $m_1$, $d_1$ represents a height of a ray on the principal plane of the objective lens from the optical axis for the numerical aperture $NA_1$ at the first lateral magnification $m_1$, and $u_1$ represents an incident angle of the ray to the objective lens for the numerical aperture $NA_1$ at the first lateral magnification $m_1$.

5. The optical system of claim 4, wherein the following condition is satisfied, $$0.002 \cdot f \geq \{SC(m_1:NA_1) - SC(m_1:NA_2)\} \geq -0.003 \cdot f$$

6. The optical system of claim 4, wherein the following condition is satisfied, $$-0.003 \cdot f \geq \{SC(m_1:NA_1) - SC(m_1:NA_2)\} \geq -0.012 \cdot f$$

7. The optical system of claim 1, wherein the first lateral magnification $m_1$ is substantially zero.

8. The optical system of claim 1, wherein the following condition is satisfied, $$NA_1 \geq 0.50.$$

9. The optical system of claim 1, wherein the following condition is satisfied, $$NA_2/NA_1 < 0.8.$$

10. The optical system of claim 1 further comprising a divergence degree changing lens provided on a light source side of the objective lens,
   wherein the magnification changing means changes the magnification of the objective lens by moving the divergence degree changing lens in a direction of the optical axis.

11. The optical system of claim 1 further comprising a correction lens provided on a light source side of the objective lens,
   wherein the magnification change means changes the magnification of the objective lens by inserting or removing the compensating lens to or from the optical system.

12. The optical system of claim 1 further comprising a hologram provided on a light source side, wherein the magnification change means changes the magnification of the objective lens by selecting one of plurality of luminous flux emitted from the hologram lens.

13. The optical system of claim 1, wherein one surface of the objective lens is a hologram surface, the magnification change means changes the magnification of the objective lens by selecting one of plurality of luminous flux emitted from the hologram surface.

14. The optical system of claim 1, wherein the light source contains two light sources having different wavelength from each other, and the magnification change means changes the magnification of the objective lens by switching the two light sources.

15. An objective lens in which when the objective converges a light emitted from a light source onto an information recording surface of a first optical information recording medium through a transparent substrate having a first thickness, the objective lens has a first lateral magnification $m_1$ and a first numerical aperture $NA_1$, and when the objective converges the ray emitted from the light source onto an information recording surface of a second optical information recording medium through a transparent substrate having a second thickness, the objective lens has a second lateral magnification $m_2$ that is less than $m_1$ and a second numerical aperture $NA_2$, the objective lens comprising:

(a) a first surface; and (b) a second surface provided opposite the first surface, wherein the objective lens satisfies the following conditional expression, $$NA_1 > NA_2,$$

and wherein an amount of an offense against sine condition $SC(m_1:NA_2)$ represented by the following expression for $NA_2$ at the first lateral magnification $m_1$ of the objective lens satisfies the following conditional expression, $$0.06 \geq SC(m_1:NA_2)/f \geq 0.002$$

and $$SC(m_1:NA_2) = d_2 \cdot \cos(u_2)/NA_2 - (1-m_1) \cdot f$$

wherein f represents a focal length of the objective lens, $NA_2$ represents a numerical aperture of the objective lens at the second lateral magnification $m_2$, $d_2$ represents a height of a ray on a principal plane of the objective lens from an optical axis for the numerical aperture $NA_2$ at the first lateral magnification $m_1$, and $u_2$ represents an incident angle of the ray to the objective lens for the numerical aperture $NA_2$ at the first lateral magnification $m_1$.

16. The objective lens of claim 15, wherein the objective lens is a bi-aspherical single lens.

17. The optical system of claim 15, wherein the following condition is satisfied, $$NA_2 \leq 0.55$$

and $$0.03 \cdot f \geq SC(m_1:NA_2) \geq 0.002 \cdot f$$

18. The objective lens of claim 15, wherein an amount of an offense against sine condition $SC(m_1:NA_1)$ represented by the following expression for $NA_1$ at the first lateral magnification $m_1$ and $SC(m_1:NA_2)$ satisfy the following condition, $$\{SC(m_1:NA_1) - SC(m_1:NA_2)\} \leq 0.002 \cdot f$$

$$SC(m_1:NA_1) \geq -0.002 \cdot f$$

and $$SC(m_1:NA_1) = d_1 \cdot \cos(u_1)/NA_1 - (1-m_1) \cdot f$$

where $NA_1$ represents a numerical aperture of the objective lens at the first lateral magnification $m_1$, $d_1$ represents a height of a ray on the principal plane of the objective lens from the optical axis for the numerical aperture $NA_1$ at the first lateral magnification $m_1$, and $u_1$ represents an incident angle of the ray to the objective lens for the numerical aperture $NA_1$ at the first lateral magnification $m_1$.

19. The objective lens of claim 18, wherein the following condition is satisfied, $$0.002 \cdot f \geq \{SC(m_1:NA_1) - SC(m_1:NA_2)\} \geq -0.003 \cdot f$$

20. The objective lens of claim 18, wherein the following condition is satisfied, $$-0.003 \cdot f \geq \{SC(m_1:NA_1) - SC(m_1:NA_2)\} \geq -0.012 \cdot f$$

21. The objective lens of claim 15, wherein the first lateral magnification $m_1$ is substantially zero.

22. The objective lens of claim 15, wherein the following condition is satisfied, $$NA_1 \geq 0.50.$$

23. The objective lens of claim 15, wherein the following condition is satisfied, $$NA_2/NA_1 < 0.8.$$

* * * * *

UNITED STATES PATENT AND TRADEMARK OFFICE
CERTIFICATE OF CORRECTION

PATENT NO. : 5,724,335
DATED : March 03, 1998
INVENTOR(S) : Masaya KOBAYASHI et al.

It is certified that error appears in the above-indentified patent and that said Letters Patent is hereby corrected as shown below:

Claim 11, column 14, line 54, "compensating" should read --correction--.

Claim 14, column 14, line 67, "wavelength" should read --wavelengths--.

Claim 15, column 15, line 4, after "objective" (second occurrence), insert --lens--.

Claim 15, line 10, after "objective", insert --lens--.

Signed and Sealed this

Seventh Day of July, 1998

Attest:

BRUCE LEHMAN

*Attesting Officer*      *Commissioner of Patents and Trademarks*